United States Patent [19]
Fleming et al.

[11] Patent Number: 5,448,706
[45] Date of Patent: Sep. 5, 1995

[54] ADDRESS GENERATOR FOR MULTI-CHANNEL CIRCULAR-BUFFER STYLE PROCESSING

[75] Inventors: Michael E. Fleming; Eric C. Anderson, both of Vancouver, Wash.

[73] Assignees: Sharp Microelectronics Technology, Inc., Camas, Wash.; Sharp Kabushiki Kaisha, Osaka, Japan

[21] Appl. No.: 882,645

[22] Filed: May 13, 1992

[51] Int. Cl.$^6$ .................. G06F 12/00; G06F 13/00; G06F 13/18; G06F 15/332
[52] U.S. Cl. .................. 395/421.07; 395/410; 364/728.02
[58] Field of Search .............. 395/400, 425, 325; 364/726, 728.02

[56] References Cited

U.S. PATENT DOCUMENTS

| | | | |
|---|---|---|---|
| 4,060,850 | 11/1977 | Speiser | 364/728.02 |
| 4,169,289 | 9/1979 | Shively | 395/250 |
| 4,800,524 | 1/1989 | Roesgen | 395/400 |
| 4,908,748 | 3/1990 | Pathak et al. | 395/400 |
| 5,032,986 | 7/1991 | Pathak et al. | 395/400 |
| 5,038,311 | 8/1991 | Monastra et al. | 364/726 |
| 5,072,418 | 12/1991 | Boutaud et al. | 364/715.06 |
| 5,163,017 | 11/1992 | Wong et al. | 364/726 |
| 5,163,018 | 11/1992 | Ikegaya et al. | 364/726 |
| 5,222,223 | 6/1993 | Webb, Jr. et al. | 395/425 |
| 5,282,275 | 1/1994 | André et al. | 395/400 |
| 5,285,527 | 2/1994 | Crick et al. | 395/425 |

Primary Examiner—Jack B. Harvey
Assistant Examiner—Michael A. Whitfield
Attorney, Agent, or Firm—Fliesler, Dubb, Meyer & Lovejoy

[57] ABSTRACT

A one-chip address generator for producing a sequence of address signals for application to a memory containing a plurality of circular buffers. The address generator chip is capable of processing service requests from a plurality of channels on a prioritized basis. Service requests can arrive asynchronously at different rates. A channel-specific length or overlap value can be assigned to each servicing of a request. A seamless pipeline structure is provided for processing the service requests of subsequent channels immediately after completion of service for a first requesting channel.

25 Claims, 11 Drawing Sheets

ADDRESS GENERATOR FOR MULTI-CHANNEL CIRCULAR-BUFFER STYLE PROCESSING

BACKGROUND

1. Field of the Invention

The invention is generally directed to digital signal processing. The invention is more specifically directed to a method of generating a sequence of address signals for use in a digital signal processing system where the system performs finite impulse response (FIR) or fast Fourier transform (FFT) or other circular-buffer style processing on input data received from a plurality of digitally sampled signal sources.

2a. Cross Reference to Related Applications

The following copending U.S. patent application(s) is/are assigned to the assignee of the present application, is/are related to the present application and its/their disclosures is/are incorporated herein by reference:

(A) Ser. No. 07/877,949 filed Apr. 30, 1992 by Raul Aguilar and Jeffrey Miller and entitled, DIGIT REVERSE FOR MIXED RADIX FFT; and (B) Ser. No. 07/877,317 filed May 1, 1992 by Michael E. Fleming and entitled, MULTI-PORT DIGITAL SIGNAL PROCESSOR.

2b. Cross Reference to Related Patents

The following U.S. patent(s) is/are related to the present application and its/their disclosures is/are incorporated herein by reference:

(A) U.S. Pat. No. 4,908,748 issued Mar. 13, 1990 to B. Pathak, et al, and entitled, DATA PROCESSING DEVICE WITH PARALLEL CIRCULAR ADDRESS HARDWARE; and (B) U.S. Pat. No. 5,032,986 issued Jul. 16, 1991 to B. Pathak, et al, and entitled, DATA PROCESSING DEVICE WITH PARALLEL CIRCULAR ADDRESS HARDWARE.

3. Description of the Related Art

A classic approach in digital signal processing (DSP) uses tapped delay lines with weighted outputs to perform real-time finite-impulse-response (FIR) filtering. Digitized sample data enters a front end of the tapped delay line, one new data item per clock cycle, while earlier received, and thus older, data items shift serially towards the back of the line. A summing means is provided for adding together the weighted outputs of the tapped delay line. A filtered version of the input signal stream develops at the output of the summing means over time. Different FIR filtering schemes call for different lengths of delay and different sets of weighting coefficients.

In the early days of DSP technology, a chain of series-connected synchronous shift registers was used to define the delay line. Digital multipliers were attached to the delay line, typically allotting one multiplier for each shift register, and used to multiply the outputs of the shift registers by corresponding weighting-coefficients. The maximum amount of delay which could be applied to any given item of new input data was defined by the system clock rate and the total number of shift registers in the series chain. This number is sometimes referred to as the "length" of the FIR filter. A digital summing means was also provided for collecting and summing the outputs of the shift registers and/or multipliers.

Modern DSP designs replace the classic chain of series-connected shift registers with a single random access memory unit (RAM). Input data items (sample point values) are written into uniquely addressed locations of the RAM unit when received. They are afterwards read out, as needed, and supplied to a recursively operating weight-and-sum processing unit. The weight-and-sum processing unit multiplies each readout data item by a corresponding weighting coefficient and adds the result to a rolling subtotal. The rolling subtotal corresponds to the output of the classic FIR filter.

A circular-buffer scheme is often used to minimize the amount of storage capacity required in the RAM unit. Old sample values, which are no longer needed, are overwritten by new input data. A circular buffer management system keeps track of which RAM locations hold the newest, still in-use data items, and which RAM locations store the oldest, usually-discardable data items.

Management of circular buffer addressing is relatively trivial in cases where the sample rate of the incoming data is relatively low, say 1000 input items (data words) per second, and a single filter having a fixed filter length equivalent to that of, say 64 shift registers, is being implemented. A general purpose microprocessor operating at a clock speed of 10 MHz or better can be used to perform buffer management calculations and to output an appropriate sequence of address signals for storing and/or fetching sample values into/out-of RAM on a real-time basis.

The general-purpose microprocessor becomes too slow, however, when relatively large numbers of input channels are to be simultaneously processed in real-time by different filters and/or when the combined data sampling rates of the channels exceed the peak processing rate of the microprocessor. This can occur for example when the incoming data arrives from a multichannel wide-bandwidth communication system, or from a digital video source or from any other high-throughput source.

Recently, a class of high-performance, user-configurable DSP integrated circuit units have been introduced. The Sharp LH9124 is an example. Each LH9124 DSP unit is capable of processing a continuous stream of 48-bit wide input words at rates as high as 40 MHz ($4 \times 10^6$ input words per second), with each 48-bit word being composed for example of a 24-bit real part and a 24-bit imaginary part. This development opens the way for commercially-practical digital processing of real-time signals produced by digital telemetry systems, digital image processing systems, digital radio, digital video, digital speech processing systems, tomography systems, and the like.

Circular buffer address management in such high-speed multi-channel environments remains a problem, however.

SUMMARY OF THE INVENTION

It is an object of the invention to provide a high-speed address signal generator for supplying appropriate address sequences to memory devices in high-speed circular-buffer types of digital signal processing (DSP) systems such as those that have the capability to spread their signal processing performance over multiple channels.

An address signal generator in accordance with the invention is disclosed for servicing a multiplicity of channels in seamless fashion, where each channel can have an independent, variable sample rate and the DSP system can process the data of a given channel using a channel-specific length and/or a channel-specific overlap value.

One embodiment of the address generator comprises an integrated circuit chip on which there are defined: an on-chip arbitration unit, an SP's (start-pointers) register file for storing a plurality of buffer start-pointers, a start-pointer updating unit for updating a specified start-pointer within the SP's register file, an OL's register file for storing a plurality of filter operating lengths (or overlap values), a variable-field commutator (VFC) for generating a start-of-buffer address signal having a data structure corresponding to the size of a specified memory unit and a prespecified number of channels, and a variable-field address incrementor for outputting a sequence of address signals which point to sequential locations in a wrap-around buffer area of the specified memory unit.

Address sequence generation begins with receipt by the on-chip arbitration unit of a service request from a given channel. When requests from multiple channels arrive simultaneously, the arbitration unit selects the highest priority request. (A bypass means is provided for allowing off-chip arbitration.)

The channel number of the channel with the highest priority is supplied to the on-chip start-pointers (SP's) register file. The SP's register file outputs a relative start-of-buffer pointer which corresponds to the selected channel. This pointer is transmitted to, and acquired by, the variable field commutator (VFC). At the same time, the on-chip SP updating unit is activated. The SP updating unit begins to update the SP value stored for the selected channel within the SP's register file immediately after the pre-existing SP value is acquired by the VFC.

The variable field commutator (VFC) has plural inputs. One VFC input receives the start-of-buffer pointer transmitted to it from the start pointers (SP's) register file. Another input of the variable field commutator receives the channel number of the selected channel.

The variable field commutator further receives a MEMSIZE signal which indicates the size of the memory unit being used for storing the circular buffer of each channel and a NCHS signal which indicates the number of channel buffers stored within the memory unit. In response to these signals, the VFC generates an address signal (GAS) which has a fixed number of bits per word but a variable data structure. A more significant, variable-width part of the generated address signal (GAS) represents the channel number of the selected channel or a memory block-address derived from the channel number. A less significant variable-width part of the generated address signal (GAS) represents the relative start-of-buffer pointer for the selected channel or a memory local-address derived from the relative start-of-buffer pointer. The most significant end of the address signal (GAS) generated by the VFC is optionally padded with zeroes.

The generated address signal (GAS) loads into the variable-field address incrementor (VFAI). At the same time, a corresponding filter length value loads into a state controller. The VFAI begins to output an auto-incremented sequence of address signals, starting with the generated address signal (GAS) initially loaded from the VFC, while the state controller keeps count of the number of address signals required for the selected channel. Seamless wrap-around to the top address of a buffer area occurs when the VFAI encounters a bottom limit of the buffer area.

A pipelined architecture permits seamless transitioning from the servicing of one channel request to the servicing of an immediately following channel request.

The above and other aspects of the invention will become more clear from the below detailed description.

BRIEF DESCRIPTION OF THE DRAWINGS

The invention will be described with reference to the following drawings in which.

DETAILED DESCRIPTION

Figure 1A:
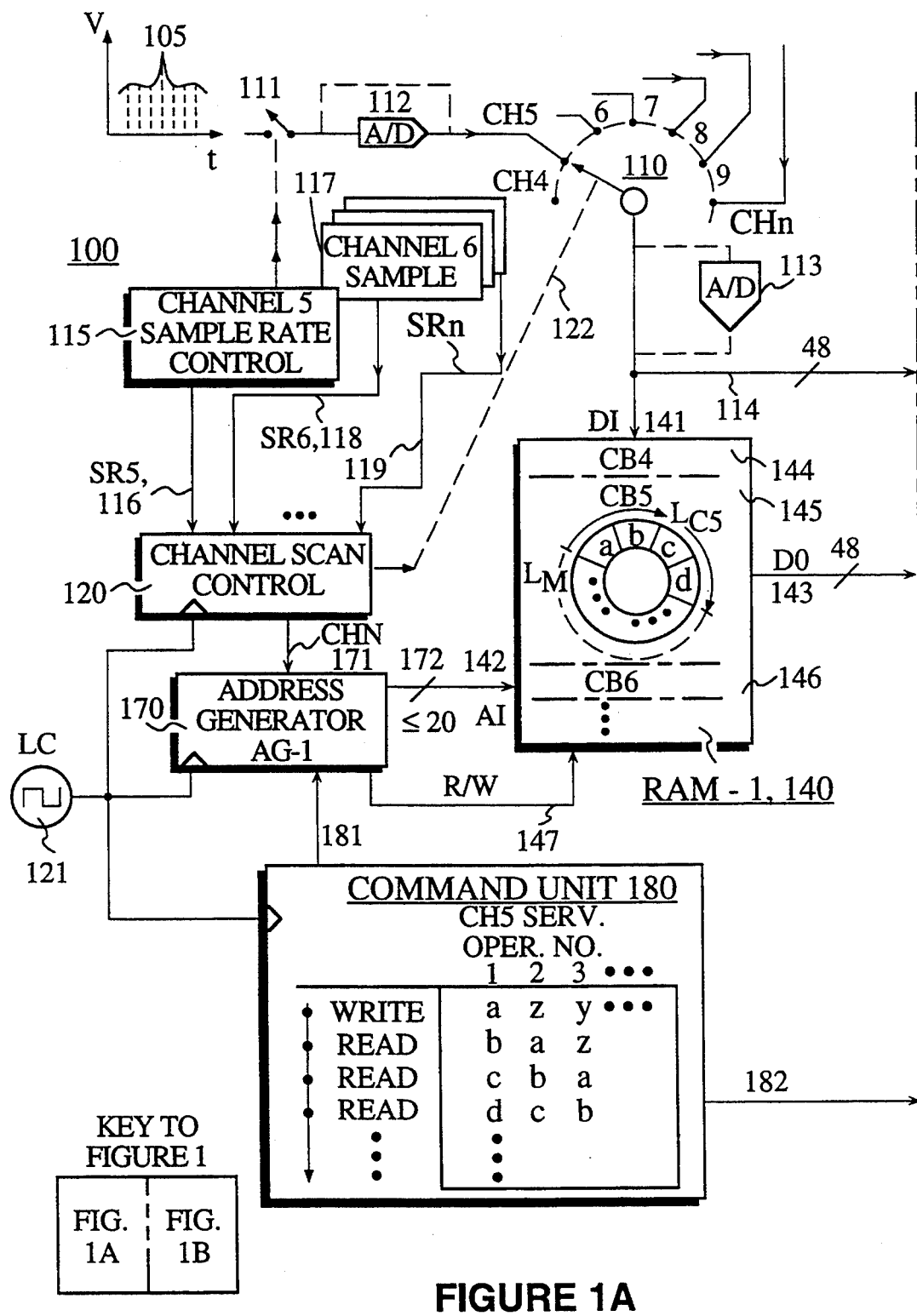
FIGS. 1A and 1B combine to form a block diagram of a digital signal processing system utilizing a circular buffer.
Figure 1B:
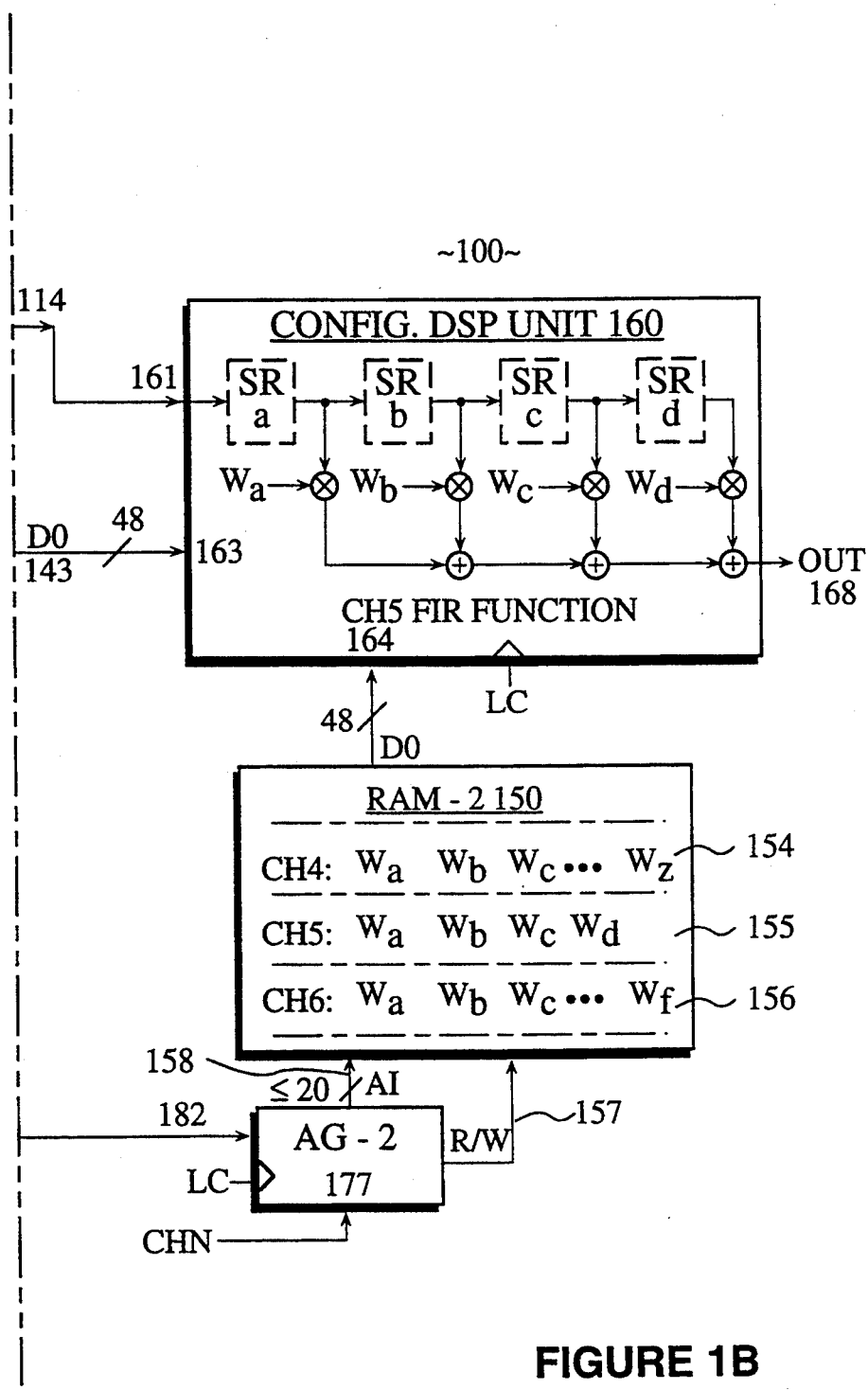

FIGS. 1A and 1B in combination form a block diagram of a multi-channel digital-signal processing system 100 which incorporates a circular buffer 145 and a buffer management subsystem (120, 170, 180) in accordance with the invention. Circular buffer 145 is one of a plurality of circular buffers (CB's) defined within a static random access memory unit (SRAM) 140.

Digital input samples enter the DSP system 100 from one or a plurality of data supply channels (CH1, CH2, CH3, CH4, . . . , CHn, only a few shown). A time-domain signal multiplexer 110 is often provided for selectively coupling data from one of the channels into SRAM unit 140 and other parts of the DSP system 100.

One of the supply channels, CH5, is shown to include a quantizing switch 111. The switch 111 samples an incoming signal 105 periodically or aperiodically and supplies the samples to the CH5 input terminal of multiplexer 110. The incoming signal 105 can be analog or digital. If incoming signal 105 is analog, an analog-to-digital converter (A/D) 112 can be provided between switch 111 and the CH5 input terminal of multiplexer 110 as shown by the solid connection. Alternatively, if all channels receive analog signals, a shared analog-to-digital converter (A/D) 113 can be provided between the output of multiplexer 110 and memory unit 140 as shown by one of the dashed-line connections of FIG. 1A. In another alternative (not shown), one or a few A/D converters are provided and each is shared by a subset rather than all of the channels.

Incoming signal 105 is often supplied to the DSP system 100 in real time, as soon as it is generated. But it can also be pre-recorded and played back at a speed slower than its real time production speed.

A channel sample-rate controller 115 controls the actuation rate of the CH5 quantizing switch 111. Each time that switch 111 momentarily closes, a new sample value presents itself at the CH5 input terminal of multiplexer 110. The sample signal remains valid until overwritten by an even newer sample signal. As switch 111 closes, a channel-5 service-request signal (SR5) 116 is simultaneously transmitted from the CH5 sample rate control unit 115 to a channel scan control unit 120 of system 100.

Although FIG. 1A shows the structure of just one data-supply channel (CH5) in full, it is to be understood that the other data supply channels (CH1 through CHn) are present, each with a corresponding quantizing switch (111), rate control unit (115) and/or other appropriate components (e.g., a channel servicing A/D unit 112). By way of example, the CH6 sample rate control unit is shown at 117. Each time its corresponding quantizing switch (not shown) closes, a respective SR6 service request signal 118 issues from the CH6 rate control unit 117 to scan control unit 120. Similarly, when the quantizing switch of channel CHn closes, a SRn service request signal 119 issues from the CHn rate control unit (not shown) to scan control unit 120.

Each channel (CH1–CHn) can forward input samples to the corresponding input terminal of multiplexer 110 at an independent, asynchronous sampling rate. A separate A/D converter can be provided for each channel as shown at 112, or alternatively, a single A/D unit can service all channels as indicated at 113. If the incoming signals (105) of all channels are already in digital format, the illustrated A/D units 112 or 113 may be dispensed with.

The channel scan control unit 120 stores each received service request (SR1 through SRn) and synchronizes it with the pulses of a local clock generator (LC) 121. A request prioritization function is provided within the channel scan control unit 120 for handling conditions in which multiple service requests are received at the same time. The scan control unit 120 is optionally coupled as indicated by dashed connection 122 to control multiplexer 110 and thereby couple the incoming signal (105) from of the highest priority requesting-channel to the output terminal of multiplexer 110. Alternatively, another control unit (not shown) moves the symbolic armature of multiplexer 110 to couple its output terminal to receive the incoming signal of the highest priority one of the requesting channels.

FIG. 1A shows the case where the request from channel CH5 is to be serviced. The symbolic armature of multiplexer 110 is shown coupling the CH5 incoming signal 105 to the data input port (DI) 141 of memory unit 140. The channel output signal is also coupled at the same time to a first input port 161 (FIG. 1B) of a user-configurable DSP unit 160. The digitized output of multiplexer 110 is referred to here as the new sample signal 114. In the illustrated case, each new sample signal 114 is a parallel 48-bit wide data word.

While a new sample signal 114 is presented to the data input port (DI) 141 of memory unit 140 and to the first input port 161 of the DSP unit 160, the channel scan control unit 120 activates a set of first and second address generators, (AG-1) 170 and (AG-2) 177. The activated first address generator (AG-1) 170 begins to supply a finite sequence of address signals 172 to an address input port (AI) 142 of memory unit 140. The effective bit width of each generated address signal (GAS) 172 is a function of the overall memory capacity of memory unit 140. If memory unit 140 has the capacity to store $2^{20}$ data words (1-Megaword storage capacity), each generated address signal (GAS) 172 can have an effective width as large as 20 bits each. If the storage capacity of memory unit 140 is smaller, say $2^{10}$ data words, the effective width of each generated address signal (GAS) 172 is correspondingly reduced to 10 bits. As already mentioned, plural circular buffer (CB) areas are defined within the memory space of memory unit 140. One particular circular buffer 145, is shown to have four specific memory locations, respectively labeled: a, b, c and d. This number of locations is also referred to here as the "filter length" $L_{C5}$ of channel CH5. It corresponds to the number of shift registers (SR-a through SR-d) which traditionally would have been implemented within the DSP unit 160 if the classical chain of series-connected shift registers had been used.

In the classic arrangement, which is shown hypothetically within block 160; a first shift register, SR-a, receives and stores the newest channel signal 114 during a first system clock cycle. During a following second system clock cycle, the data stored within the first hypothetical shift register SR-a shifts to a subsequent, second hypothetical shift register SR-b. During the same second clock cycle, the first shift register SR-a receives the next sample value from input port 161. Similarly, in the third clock cycle, the oldest data which was previously stored in second shift register SR-b, shifts to a third hypothetical shift register, SR-c. The next oldest data shifts from SR-a into SR-b and the newest channel data 114 shifts into SR-a. In the fourth clock cycle, the oldest data shifts into hypothetical register SR-d. In subsequent cycles, newer data overwrites the oldest data held within the fourth shift register SR-d.

The outputs of registers SR-a through SR-d are respectively multiplied by weighting functions $W_a$ through $W_d$, summed together and outplat from the DSP unit 160 through an output port 168. A second memory unit (SRAM) 150 supplies the required weighting values $W_a$–$W_d$ through a coefficient-receiving port 164 of the DSP unit 160. Second address generator (AG-2) 177 supplies the necessary address signals to an address input (AI) port 158 of the second memory unit 150.

Address generators 170 and 177 (AG-1 and AG-2) are user-programmable and they respond to command signals 181 and 182 sent from a command unit: 180.

Like the shift registers, the illustrated multipliers and adders within block 160 are also hypothetical. The DSP unit 160 (which is preferably a Sharp LH9124 or a similar integrated circuit device) contains a user-configurable, recursive weigh-and-sum means which sequentially multiplies each received sample value (from port 161 or 163) by its corresponding weighting coefficient and adds the result to a rolling subtotal. The sample FIR process that is used for filtering signals received from channel CH5 is drawn in the block of DSP unit 160 for illustrative purposes only. DSP unit 160 can be configured to implement a unique filter design for each channel.

Because hypothetical shift registers SR-a through SR-d and plural multipliers for $W_a$ through $W_d$ do not actually exist within the configurable DSP unit 160, the circular buffer 145 within the first memory unit (RAM-1) 140 is used to mimic the functions of hypothetical registers SR-a through SR-d and supply their respective time-delayed signals in sequence to a weight-and-sum means within the DSP unit 160. At the same time, another circular buffer 155 within the second memory unit (RAM-2) 150 supplies the corresponding sequence of weighting coefficients $W_a$ through $W_d$ to the weight-and-sum means within DSP unit 160.

The filter functions for each channel (e.g., CH5) are implemented by sequencing through the contents of the circular buffers (e.g., 145 and 155) associated with that channel a number of times. For example, during a first of plural channel-servicing operations associated with channel CH5, the newest sample value 114 then received from the channel CH5 terminal of multiplexer 110 is written into location "a" of circular buffer 145. Sample signal 114 is at the same time presented to the DSP unit 160 for multiplication by first weighting value $W_a$. Weighting value $W_a$ is itself read out from a corresponding location of second memory unit (RAM-2) 150 and presented to DSP port 164. The weighted result is then summed into a rolling subtotal maintained within an accumulator (not shown) of the DSP unit 160.

As the DSP unit 160 completes its multiplication of the "a" value by weighting coefficient $W_a$, the value stored in the next location "b" of the circular buffer 145 is read out through a data output port (DO) 143 of the first memory unit (RAM-1) 140 and introduced into the DSP unit 160 through another input port 163 of the DSP unit. Weighting value $W_b$ is readout from a corresponding location of second memory unit (RAM-2) 150 and presented to DSP port 164. The DSP unit 160 then multiplies the readout "b" value by weighting function $W_b$ and adds the weighted value to its internal rolling subtotal.

Similarly, as the DSP unit 160 completes multiplication of the location "b" value, the value in the next location "c" of the circular buffer 145 is read out through data output port (DO) 143, input into the DSP unit 160 and multiplied by its corresponding weighting-coefficient, $W_c$. The value stored in location "d" of circular buffer 145 is treated similarly in a following clock cycle. When value "d" is read out from the circular buffer 145, the first channel servicing operation for channel CH5 (hereafter also "CH5 Service No. 1") is deemed to be complete.

Location "a" of circular buffer 145 is considered to be the start-of-buffer location for the first channel CH5 servicing operation (CH5 Service No. 1). Before the first servicing operation completes, a start-of-buffer pointer (not shown) within the first address generator AG-1 (170) rotates counter-clockwise (decrements) and thereby designates the location preceding memory position "a" as a new start-of-buffer location. This new location, while not shown in the illustration of circular buffer 145, will be referenced here as buffer location "z". It is to be understood that circular buffer 145 has memory locations respectively labeled by the alphabetic sequence; a, b, c, d, ..., w, x, y, z, where location "z" logically precedes location "a". This is not to say that buffer 145 has 26 locations. The total length $L_M$ or word count of circular buffer 145 can be any integer from 4 to the maximum capacity (MEM SIZE) of memory unit 140.

When the channel CH5 quantizing switch 111 later outputs an even newer sample value signal, a second service-request signal 116 issues from corresponding rate control unit 115 to the channel scan control unit 120. The newest CH5 sample value is written into the new start-of-buffer location, "z" of circular buffer 145 when the second service-request from CH5 (CH5 Service No. 2) is serviced. Then the values stored in subsequent locations "a" "b" and "c" are sequentially read out through the DO port 143 and processed by the DSP unit 160. The new "z" value is multiplied by weight $W_a$. The now older value "a" is multiplied by weight $W_b$. The data in location "b" is multiplied by $W_c$. The data in location "c" is multiplied by $W_d$. Position "d" is not addressed.

In a subsequent, third channel-servicing operation (CH5 Service No. 3), location "y" becomes the start-of-buffer position which receives the newest data sample while locations "z" "a" and "b" become the locations that are subsequently read out for processing by the DSP unit 160.

The above described sequence of events is illustrated in short-hand form in FIG. 1A within the block of command unit 180. The time line extends first downwardly and then to the right. Location "a" is the start of buffer 145 during the first channel CH5 servicing operation. Location "z" becomes the start of buffer position for the second CH5 request-servicing operation and so on. Command unit 180 controls the read/write (R/W) lines of memory units 140 and 150 indirectly through the AG-1 and AG-2 units (170 and 177).

As an aside, it is to be understood that although separate DI and DO buses, 141 and 143, are shown for the RAM-1 unit 140, an alternate embodiment can use a single bus for input and output data. In such an alternate embodiment, ports 141 and 143 of the RAM-1 unit 140 would merge into a single data input/output port (not shown), and ports 161 and 163 of the DSP unit 160 would similarly merge into a single data input/output port (not shown). A single bus would connect the data input/output ports of the RAM-1 and DSP units, 140 and 160; and time-domain multiplexing would be utilized to transfer signals back and forth as needed.

As a further aside, it is to be noted that, in contrast to the operations of the AG-1 unit 170, the AG-2 unit 177 does not have a rotating start-of-buffer pointer and its R/W line remains frozen in the read mode as weight $W_a$ through $W_d$ are read out to the DSP unit 160. Generally speaking, the same sequence of weighting coefficients is output for a given channel in each servicing operation. (Adaptive weighting is possible if time slots are allocated for writing new values into memory unit 150 and/or time slots are allocated for changing start-of-buffer pointers within the AG-2 unit 177.)

Between the points in time where service requests 116 are received from the sample rate control unit 115 of channel CH5, it is possible that other service requests, e.g. 118, 119, will arrive at the scan control unit 120 from one or more of the other channel sample rate controllers (e.g. 117, etc., not all shown). By way of example, assume that a SR6 service request comes in from channel CH6 at a point in time located between two service requests from channel CH5.

The service request from channel CH6 is handled in a similar manner to the way a request is handled for channel CH5. The memory space of the first memory unit (RAM-1) 140 is subdivided into separate areas, each storing a circular buffer (CB) of length $L_M$ for a particular channel. Area 145 for example, stores the circular buffer of channel CH5. This area 145 is also referred to as the CB5 area. Area 146 stores the circular buffer CB6 (not fully shown) for channel CH6. Area 144 stores the circular buffer CB4 (not fully shown) for channel CH4.

In servicing a channel CH6 request, the first address generator (AG-1) 170 outputs a finite sequence of address signals 172 starting with the start-of-buffer address of circular buffer CB6 (146). The CB6 start-of-buffer position changes before the end of the servicing operation. The filter length ($L_{C6}$, not shown) for channel CH6 can be a value other than the filter length ($L_{C5}$) used for channel CH5. In the illustrated example, channel CH6 is assumed to heive a filter length of 6. This is indicated by the symbols, $W_a W_b W_c \ldots W_f$ written in area 156 of the block representing second memory unit 150. Similarly, channel CH5 is assumed to have a filter length ($L_{C5}$) of 4 as indicated by the symbols $W_a$ through $W_d$ written in area 155 of block 150. At the same time, channel CH4 is shown to have a different filter length of $L_{C4}=26$ as indicated by its corresponding weighting coefficients $W_a$ through $W_z$ in area 154 of block 150. Much larger filter lengths (e.g. $L_{Cn}=256$, 1024, etc.) are also possible for any given channel, CHn.

The first and second address generators (AG-1 and AG-2) are charged with the task of keeping track of the filter length ($L_{Cn}$) associated with each channel (CH4, CH5, CH6, ... CHn) and of outputting an appropriate number of addresses in sequence to respective memory units 140 and 150 for each given channel.

Figure 2A:
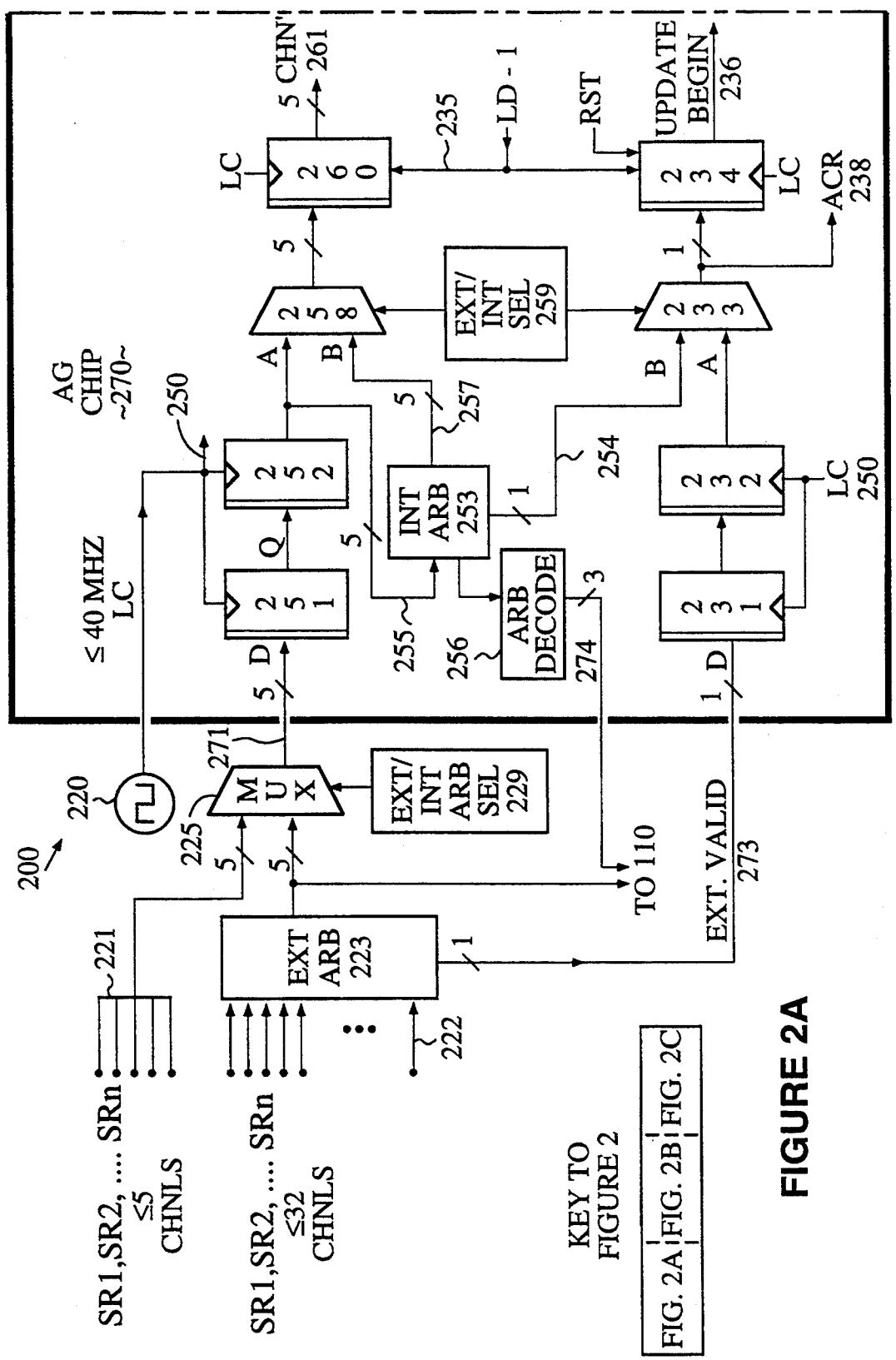
FIGS. 2A–2C combine to form a block diagram of a circular buffer management system in accordance with the invention.
Figure 2B:
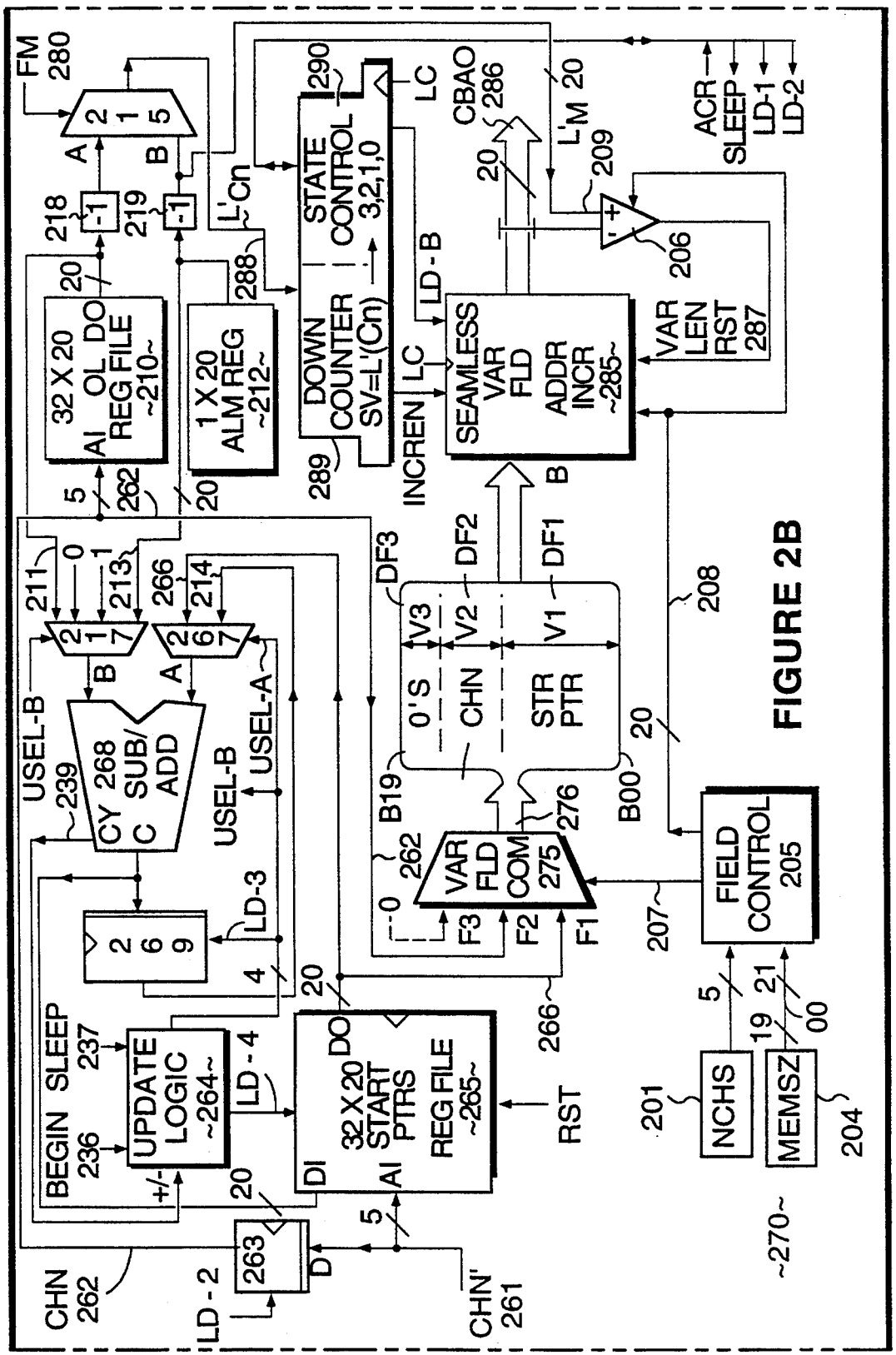
Figure 2C:
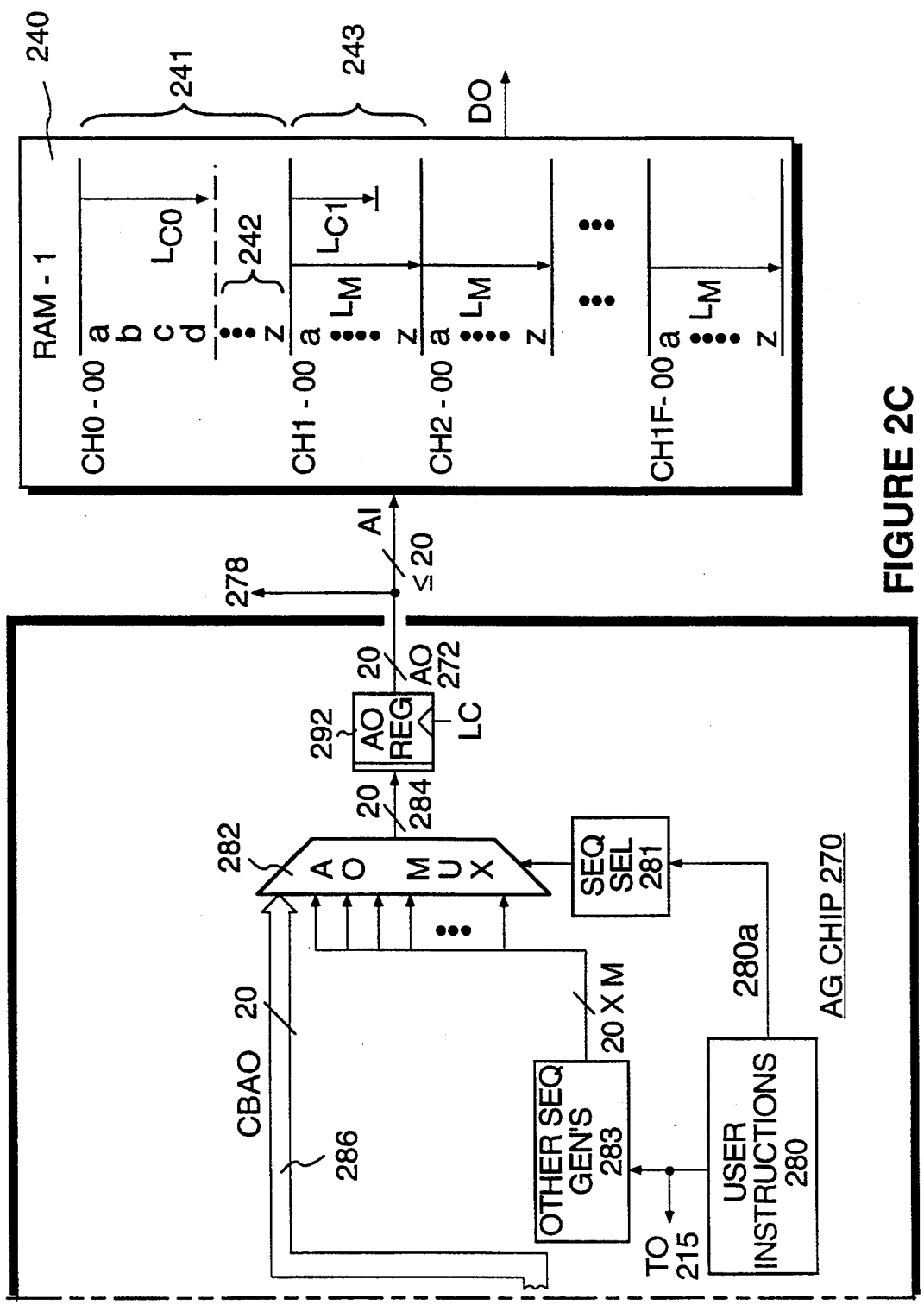

FIGS. 2A, 2B and 2C combine to show details of a circular-buffer (CB) management system 200 in accordance with the invention which includes an address generator (AG) chip 270. The address generator chip 270 is composed of a monocrystalline silicon substrate on which CMOS circuitry (complementary metal-oxide-semiconductor) is defined with 0.8 micron linewidth geometries to operate synchronously at clock speeds as high as 40 MHz. An on-chip memory means 30 (not fully shown) is provided for storing user-provided configuration instructions.. On-chip multiplexers provide data paths corresponding to the user-provided configuration instructions.

FIG. 2A shows a front end section of the CB management system 200. The front end section includes means for receiving channel-service requests $SR_1, SR_2, \ldots, SR_n$ corresponding to 116, 118, ..., 119 of FIG. 1A from a plurality of channels, synchronizing the requests to a local clock (LC) 220 and arbitrating among concurrently received requests. Most of the front end functions are performed by circuitry within the AG chip 270. Arbitration can be performed on-chip or off-chip.

FIG. 2C shows a back end section of the CB management system 200. The back end section includes a random access memory unit (RAM-1) 240 which receives address vectors sent over a 20-bit wide address output bus (AO) 272 of the AG chip 270. The RAM-1 unit 240 can have a memory space as large as one Megaword ($2^{20}$ data words) but it can also have a much smaller storage capacity. Address signal generating means are provided within the AG chip 270 for generating address vectors of appropriate field width for accommodating any storage capacity in the range $2^4$ to $2^{20}$ data words, where storage capacity is an integral power of two.

As mentioned, the AG chip 270 is user-programmable. It can be programmed to generate a large number of different address sequence patterns. Circular buffer address sequences are just one type of sequences that can be generated by the AG chip 270. Sequence generators for producing address sequences other than those used in circular buffer management are represented as being within block 283 of FIG. 2C. The implementation of block 283 is outside the scope of the present invention and its details are therefore not discussed here beyond mentioning that one of M alternate sequences (M is an integer greater than one) are sent over a 20-bit wide bus to an on-chip address output (AO) multiplexer 282. A user-provided sequence selecting command 280a is transmitted from an on-chip user-instructions storage file 280 to an on-chip sequence selector 281. The sequence selector 281 controls the output address (AO) multiplexer 282. Multiplexer 282 couples a selected one of its inputs to a 20-bit wide parallel output bus 284. Bus 284 connects to the input of a 20-bit wide address output register 292. Register 292 is clocked by the local clock (LC) and drives the chip address output bus (AO) 272.

One of the inputs supplied to the address-bus multiplexer 282 is a parallel 20-bit wide circular-buffer address-output bus (CBAO) 286. The CBAO bus 286 is driven by a 20-bit wide address-incrementing unit 285 shown in FIG. 2B.

The details of FIGS. 2A-2C can be better appreciated by first taking a short overview of some key components. Among the key components provided on the AG chip 270 are:

(a) a 32 by 20-bit wide OL's register file 210 that is used for storing channel-specific circular-buffer lengths (or, in another mode, channel-specific overlap values);

(b) a 1 by 20-bit wide ALM register 212 that is used for storing a maximum length value $L_M$ (or, in another mode, an alternate length value);

(c) a 32 by 20-bit wide SP's register-file 265 that is used for storing channel-specific start-of-buffer pointers;

(d) a variable-field commutator (VFC) 275 that is used for generating an absolute start-of-buffer address signal which has a system-specific data structure;

(e) a seamless variable-field address incrementing unit (VFAI) 285 that is used for generating a sequence of absolute buffer address signals;

(f) a field-size control unit 205 that is used for controlling the data structure of signals generated by the VFC 275 and VFAI 285; and (g) an SP update control unit 264 which is used in combination with a subtracting/adding unit 268 to update start-of-buffer pointers stored in the SP's register file 265.

The operations of these key components will be explained in due course.

Referring to FIG. 2A, channel service-requests (e.g. $SR_1, SR_2, \ldots, SR_n$) enter the AG chip 270 either directly by way of a 5-bit wide direct input bus 221, or indirectly by way of a wider bus 222 and an external arbitor 223. If requests enter by way of the direct input bus 221, the AG chip 270 can perform arbitration internally and can service as many as five independent channels. If requests enter by way of the external arbitor 223, the AG chip 270 can service as many as 32 independent channels.

Typically, only one or the other of the direct and indirect input buses, 221 and 222 is used. In such a case, the illustrated multiplexer 225 of FIG. 2A is eliminated and bus 221 or the output of arbitor 223 connects directly to the 5-bit wide service-request input bus 271 of the AG chip 270.

When external arbitration is utilized, channel service requests (SR's) are asserted on one or more of the 32 input lines 222 of external arbitor 223. The external arbitor 223 selects the highest priority request and presents the channel number (CHN) of the highest priority requesting channel as a 5-bit binary coded number to the request input bus 271 of AG chip 270 (by way of the external multiplexer 225 in the illustrated set up of FIG.

2A). A user-programmable external/internal arbitration selector 229 operates multiplexer 225 to pass the output from external arbitor 223 to input bus 271. The output from arbitor 223 optionally connects to operate the symbolic armature of the channel multiplexer 110.

Input bus 271 connects to the D input of a first on-chip input synchronizing register 251 (5-bits wide). The Q output of register 251 connects to the D input of a second synchronizing register 252 (also 5-bits wide). Registers 251 and 252 are clocked by the local clock line (LC) 250. The local clock can operate at speeds as high as 40 MHz. Service requests can be applied to the chip at rates as high as one fourth that of the local clock (10 MHz).

When the external arbitor 223 presents a valid channel number to chip input bus 271 (through multiplexer 225), it also presents an external valid signal to the chip through another input line, 273. Chip input line 273 connects to the D input of a third on-chip synchronizing register 231 (1-bit wide). The Q output of register 231 connects to the D input of a fourth synchronizing register 232 (1-bit wide). The Q output of the fourth register 232 feeds one input ("A") of a first dual-port multiplexer 233. Third and fourth registers 231 and 232 are also clocked by the local clock (LC).

While not always shown, it is to be understood that all other synchronous components on the AG chip 270, such as components 260, 234, 269, 285 and 290 are also clocked by the same local clock (LC).

The 5-bit wide output of the second synchronization register 252 feeds one input port ("A") of a second dual-port multiplexer 258. A user-programmable on-chip ext/int mode selector 259 controls multiplexers 233 and 258. When external mode is selected, the aforementioned input ports, "A" and "A" of respective multiplexers 233 and 258 are selected and coupled to their respective outputs. When internal mode is selected, the alternate "B" and "B" input ports of multiplexers 233 and 258 are selected as their outputs.

The internal arbitor 253 substantially mimics the functions of the external arbitor 223 with a major exception being that the internal arbitor 253 is limited to handling no more than 5 channels. Prioritization is hardwired. One pin of input bus 27DL is deemed highest priority and the other four pins have successively lower priority. Systems having 5 or less channels can use the on-chip arbitor 253 and thereby avoid loss of board space otherwise consumed by the external arbitor 223. Service requests move over direct bus 221, through synchronizing registers 251 and 252 to an input side of internal arbitor 253 by way of a 5-bit bus 255 coupling the output of register 252 to the input of internal arbitor 253. Another 5-bit bus 257 couples the output of internal arbitor 253 to the B input of multiplexer 258. A 1-bit wide internal-valid line 254 transmits an internal-valid signal from internal arbitor 253 to the B input of multiplexer 233.

When the on-chip selector 259 selects the internal arbitration mode, the 5-bit output 257 of the internal arbitor passes through multiplexer 258 to its output. The 1-bit valid signal on line 254 passes through multiplexer 233 to its output. An internal arbitration state decoder 256 is optionally included in the AG chip 270 for indicating to the external world what choice, if any, the internal arbitor 253 made. A 3-bit bus 274 extends from decoder 256 to the interconnect pins of chip 270. Five of the 8 possible code states indicate valid arbitration choices and one or more other code states optionally indicates a nonvalid choice. Bus 274 optionally connects to operate the symbolic armature of channel multiplexer 110 (FIG. 1) to select the highest priority channel.

In an alternative embodiment, the selection made by internal arbitor 253 appears in delayed form on a channel output bus 278 (FIG. 2C) which is hardwired to appropriate lines of AO bus 272.

In yet another embodiment, the internal arbitor 253 does not control the channel multiplexer 110. Instead another off-chip circuit (not shown) does so and that circuit sends a five-bit wide command code to chip input bus 271 indicating the channel which is to be serviced. If conflicting codes are received simultaneously, the highest-priority code is accepted as the one representing the channel to be serviced. Internal arbitor 253 simply assumes that channel multiplexer 110 is switched to the highest priority one of the active channels indicated on bus 271.

In yet a further embodiment, incoming data is applied from a shared data source to a plurality of different FIR filters. (Multiplexer 110 can be eliminated from the system 200.) The plural filters are to process the same incoming data signal 105 using different filter lengths, weighting factors and/or overlap values. A system control unit (not shown) sends an active-channels indicating signal to the SRn input terminals of the DSP system 200 in order to indicate to the DSP system 200 which filter or filters are to process the incoming data. Because the newest to oldest sample values of each filter are stored in a single RAM unit (140), only one filter is able to first process the newest sample value 114 received from the shared data source. The internal arbitor 253 or external arbitor 223 decides which filter is to be the one that first processes the newest sample value 114.

Assume that the external arbitration mode is selected and a valid service request code is presented to external arbitor 223. An external valid signal output from arbitor 223 passes through synchronizing registers 231, 232 and through port "A" of multiplexer 233 to the input side of a succeeding, 1-bit wide update requesting register 234. The channel number (CHN) presented at port "A" of multiplexer 258 simultaneously passes through multiplexer 258 to the input side of a following 5-bit wide channel-number storing register 260. Registers 234 and 260 are both clocked by the local chip clock (LC).

An output line 238 of multiplexer 233 (labelled ACR) connects to an on-chip state controller 290 (FIG. 2B) to indicate the presence of an "active channel request" (ACR). If the state controller 290 determines that the ACR can be serviced, the state controller 290 returns a LD-1 load-control signal to load command terminals 235 of registers 234 and 260. The LD-1 control signal goes high (H=logic true="1") if the state controller 290 determines that the channel-number storing register 260 is free to receive a new channel number in a clock cycle where the ACR signal is still present at the output 238 of multiplexer 233. (LD-1 goes high when a later-discussed state-variable transitions from an SV=2 state to an SV=1 state.)

A logic one ("1") on the LD-1 control line loads the channel number output by multiplexer 258 into the channel-number storing register 260 during the start of a local clock (LC) cycle for which it is asserted. The active LD-1 signal also loads the active channel request (ACR), if still present on line 238, into the update-requesting register 234.

Referring to FIG. 2B, the output 236 (labeled "update begin") of the update-requesting register 234 connects to a pointer-update logic unit 264. When activated, logic unit 264 steps through a 3-cycle sequence (to be described later) which uses subtracter/adder 268 to update the value of a start point (SP) held in the SP's register file 265. The 3-cycle update sequence begins after a later-described state variable signal, SV, reaches and begins to exit an SV=0 state.

When the AG chip 270 is first initialized, a chip-wide reset signal, RST, clears the update requesting register and places chip 270 in a so-called "sleep mode". The chip-wide reset signal, RST, also clears registers 251, 252, 231, 232, the SP's register file 265, and a later-described output register 292.

In sleep mode, the state SV=0 is continuously re-entered one clock cycle after the next. Detection of a logic high ACR signal takes the chip out of sleep mode. A sleep-indicating line 237 carries a sleep-mode indicating signal from state control unit 290 (FIG. 2B) to update logic unit 264. The update logic unit 264 is blocked from beginning its 3-cycle, SP update-operation if sleep mode is active. If AG chip 270 is awake rather than in sleep mode, and a 3-cycle update operation is initiated, the update logic unit 264 will issue a LD-4 load command to the SP's register file 265 for loading an output signal (C) of subtracter/adder 268 into a designated storage location at the end of the 3-cycle update sequence. The sequence will be described in more detail later on.

A 5-bit wide output 261 of register 260 connects to the address input port (AI) of the start pointers (SP's) register file 265. Output 261 also connects to the input of a pipeline register 263. The output 262 of pipeline register 263 connects to aD address input port (AI) of a channel overlaps/lengths (OL's) register file 210 and to an F2 (Field-2) input port of the variable field commutator (VFC) 275. The pipeline register output bus 262 is occasionally referred to here as the current-channel number (CHN) bus 262. For reasons that will become clearer later, the pipeline register input bus 261 is occasionally referred to here as the next-channel number (CHN') bus 261.

Pipeline register 263 loads a new value from bus 261 when a LD-2 control signal issues from state control unit 290. (It will be seen later that the LD-2 line goes high on the transition from an SV=1 state to an SV=0 state.)

The SP's register file 265 comprises a plurality of thirty two registers, each 20-bits wide. The SP's register file 265 is used to store 32 data words, each 20-bits wide. As already mentioned, when the AG chip 270 is initialized, a chip-wide reset signal (RST) initializes each of the 32 data words in the SP's register file 265 to the zero value. Other values can be written into locations of the SP's register file 265 by way of its data input (DI) port. Writing occurs only when the LD-4 control signal, supplied from the update logic unit 264, is strobed to logic high (H) at the end of a 3-cycle update operation.

The 5-bit wide CHN' signal present on bus 261 connects to an AI (address input) port of the SP's register file 265 for addressing one of the 32 registers in the SP's register file 265. The 20-bit wide start-pointer (SP) which is stored in the SP register file (265) then addressed by the CHN' signal (261), is output from a 20-bit wide parallel data output port (DO) of the SP's register file 265 onto a start-pointer bus 266. The start-pointer bus 266 connects to an F1 (Field-1) input port of the variable field commutator (VFC) 275 and also to a first input port of a dual-port multiplexer 267.

In addition to inputs F1 and F2, the variable field commutator (VFC) 275 is shown to have a dashed F3 (Field-3) input port. The F3 input port receives a binary-coded signal of all zeroes.

Variable field commutator (VFC) 275 generates a 20-bit wide output signal, referred to here as the generated address signal (GAS). The generated address signal (GAS) has three adjacent data fields DF1, DF2 and DF3 of respective variable bit-widths: V1, V2 and V3.

The first data field, DF1, includes at least the less significant bits of the start pointer (SP) presented at the 20-bit wide F1 input of VFC 275. The first variable width, V1 can be set to any value in the range four to 20 bits. If V1 is set equal to 20, the first data field DF1 will include all the bits of input field F1 and the second and third data fields, DF2 and DF3, will not be present in the 20-bit wide generated address signal (GAS) output by the VFC onto bus 276.

When present, the second data field, DF2, represents the channel number (CHN) presented to the 5-bit wide input F2 of the VFC 275. The second width variable, V2 can be set to any value in the range zero to 5 bits. If V2 is set to 5-bits, DF2 contains all 5 bits of F2. If V2 is set to zero, DF2 does not exist within the generated address signal (GAS).

When present, the third variable field, DF3, represents a padding of logic zeroes ("0") at the more significant end of the 20-bit wide: generated address signal (GAS) carried on bus 276. The third variable width, V3 can be set to any value in the range of zero to 16 bits. A field size control signal 207, which is supplied to the VFC 275 from the field size control unit 205, determines the values of variable field widths V1, V2 and by default, V3. (V3=20−[V1+V2].)

In one embodiment of the variable field commutator (VFC) 275, the F3 input need not be actually present because the zeroes which fill the DF3 data field come from a zeroed-out upper end of the 20-bit start pointer (SP) output by the SP's register file 265. This mechanism will be explained later in conjunction with FIG. 4B. For the mean time, it is easier to understand the operation of system 200 by first hypothesizing that the zero-field (F3) input port is present on the VFC 275 and that this F3 input port supplies a zero input signal to the VFC 275.

The output bus 276 extending out of VFC 275 has 20 lines, respectively labeled B00 through B19. Line B19 carries the most significant bit of the generated address signal (GAS). Line B00 carries the least significant bit of the generated address signal (GAS). The bits of the generated address signal (GAS) are also referenced as B00 through B19.

Lines B00 through B19 of the VFC output bus 276 couple to a "B" input port of the address-incrementing (VFAI) unit 285. Unit 285 is referred to here as a "seamless variable-field address incrementor" for reasons that will become apparent in due course.

The generated address signal (GAS) loads into an internal register of the address-incrementing unit 285 when a load control signal, which is referenced as LD-B, strobes to a logic high (H). State controller 290 supplies the LD-B signal. After the generated address signal (GAS) loads into the VFAI 285, the address-incrementing unit 285 preserves the DF2 and DF3 data fields which it received from the VFC 275 in the aforementioned internal register of the VFAI. The DF1 field is also preserved during a first clock cycle and then sequentially incremented by +1 in subsequent cycles, in synchronism with the local clock (LC). Incrementing continues as long as an increment-enable signal (INCREN), also supplied by the state controller 290, is raised high (H).

There are two alternate embodiments of the variable field address incrementer (VFAI) 285. In one embodiment the VFAI 285 maintains its own copy of the DF1, DF2 and DF3 fields after receiving them from the VFC 275, and as a result, the variable field commutator (VFC) 275 is free to begin generating a new address signal (GAS) after off-loading a previous one to the VFAI 285. In a second embodiment, the VFAI 285 relies on the DF2 data field output by the VFC 275 to determine what channel it is servicing. If the second embodiment of the VFAI 285 is used, the VFC 275 should not output a new DF2 channel field onto bus 276 before the VFAI 285 completes its own output onto CBAO bus 286 of the last address signal in an address signal sequence belonging to a given channel.

Referring to all three of FIGS. 2A, 2B and 2C, in said order, it can be seen that the AG chip 270 in essence has a six-stage pipelined architecture. Stage-1 starts at the input to register 251 (and register 231). Stage-2 starts with register 252 (and register 232). Stage-3 starts with register 260 (and register 234). Stage-4 starts at the input to the SP's register file 265 (and pipeline register 263). Stage-5 starts at the connection of bus 276 to the VFAI 285. Stage-6 starts at the connection of the AO multiplexer 282 to output register 292.

Pipeline start-up latency is equal to 6 LC (local clock) cycles. Once the 6-stage pipeline is filled, a continuous stream of service requests (SR7, SR8, . . . , SRn) can be processed one immediately after the next, without further delays. Stage-1 and Stage-2 (FIG. 2A) are used to synchronize received service requests with the local clock (LC) and to avoid metastability problems. Stage-3 (registers 260 and 234) is responsible for initiating the SP update operation and for transmitting the pre-existing start-pointer (SP) signal to Stage-4. Stage-4 (263, 265 and 275) is responsible for transmitting the address signal (GAS) generated by the VFC 275 to Stage-5. Stage-5 (VFAI 285) generates the required sequence of address signals. Stage-6 maintains each address signeL1 of the generated sequence valid on AO bus 272 for a full local clock (LC) cycle.

Stage-5 includes a variable-extent comparator 206 which compares part or all of a 20-bit wide signal (CBAO) output onto bus 286 from the VFAI 285 against a modified limit value, $L'_M$. $L'_M$ is equal to $L_M$ less one. ($L'_M = L_M - 1$.) The less significant V1 bits of the CBAO signal (286) form the part of CBAO which is tested against modified limit $L'_M$ by unit 206. This part is represented by the symbol: CBAO—V1':00. (V1'=V1−1.) When a limit condition is reached (CBAO—V1':00=$L'_M$), the variable-extent comparator 206 issues a variable width reset signal 287 to the VFAI 285. The variable width reset signal 287 resets the CBAO—V1':00 part of the count held within address-incrementing unit 285. The part of the CBAO signal (286) which is V2 bits wide and corresponds to the DF2 data field is preserved. The part of the CBAO signal (286) which is V3 bits wide and corresponds to the DF3 data field of all zeroes is preserved or reset to zeroes. The field size control unit 205 supplies a field size control signal 208 to the VFAI and to comparator 206 specifying the field width values, V1 and/or V1' and/or V2 and/or V3.

The 20-bit wide, circular-buffer address output signal (CBAO) 286 emanating from the address-incrementing unit (VFAI) 285 connects to the sequence-selecting multiplexer 282 (FIG. 2C), as already mentioned. It also connects to one input of comparator 206 (FIG. 2B), as already mentioned. The other input, 209, of comparator 206 receives the modified limit signal $L'_M$ representing a maximum buffer length value less one, $L_M - 1$.

Maximum length value, $L_M$ is calculated by the user and stored in the ALM register 212. $L_M$ should be set equal to the storage capacity of RAM unit 240 divided by the nearest integral power of two (e.g., 1, 2, 4, 8, 16 or 32) equal to or greater than the number of channels that are to be serviced by the system. ($L_M$=MEM-SIZE/NCHS). By way of example, if the number of channels to be serviced is 7, NCHS would be set to 8, which is the nearest equal or greater power of two. The memory space of RAM unit 240 (FIG. 2C) would be subdivided into 8 sections, each being $L_M$ datawords long. The first seven sections would hold the respective circular buffers of the 7 channels and the eighth section would be unused.

The ALM register 212 outputs its $L_M$ signal along bus 213 to a B-side decrementer 219. The B-side decrementer 219 includes combinatorial logic for decrementing the received $L_M$ signal by one and supplying the decremented signal $L'_M$ to a B-input port of multiplexer 215. A like-structured A-side decrementer 218 receives the data output (DO) of the OL's register file 210 along bus 211, decrements the received signal by one to produce an $L'_{Cn}$ signal, and supplies the decremented signal to an A-input port of multiplexer 215.

A 20-bit wide parallel output of multiplexer 215 supplies a selected one of the signals present at its A and B input ports by way of bus 288 to down counter 289. The signal present at the B input port of multiplexer 215 is applied to an input of comparator 206 by way of bus 209. Multiplexer 215 is controlled by instruction signals sent from instruction unit 280 (FIG. 2C).

In a first operating mode (a so-called FFT-CBuff mode), multiplexer 215 is controlled to always pass the $L'_M$ signal present at its B-input port to its output.

In a second operating mode (a so-called FIR-CBuff mode), multiplexer 215 is controlled to always pass the $L'_{Cn}$ signal present at its A-input port to its output. The signal output from multiplexer 215, $L'(Cn) = L'_{Cn} = L_{Cn} - 1$, moves over bus 288 into down counter 289. Down counter 289 loads the received count value, $L'_{Cn}$, and counts down from there to the zero value inclusive during succeeding clock cycles, to thereby count out a total of $L_{cn}$ control states.

At the same time, the signal output from decrementer 219 (the $L'_M = L_M - 1$ signal,) moves over bus 209 to comparator 206 and remains applied to comparator 206 over the next LCn clock cycles. $L_M$ is decremented before being input into comparator 206 because the $L_M$ RAM locations which define a buffer area for channel number CHn in memory unit 240 have respective addresses CHn—00 to CHn—[$L_M - 1$]. Wrap-around to location CHn—00 occurs when comparator 206 detects the end address, CHn—[$L_M - 1$].

Field control unit 205 generates respective field-size control signals 207 and 208 from two received signals, NCHS and MEMSZ. A 5-bit wide number-of-channels register 201 supplies the NCHS signal to the field size control unit 205. The NCHS signal represents the number of circular buffer areas available in RAM unit 240.

A 19-bit wide memory-size register 204 supplies the more significant part of a 21-bit wide MEMSZ signal to the field size control unit 205. The 21-bit wide MEMSZ signal represents the storage capacity of the RAM-1 unit 240. There are 19 allowable memory sizes, $2^2$ through $2^{20}$ in increments of times-2. The least significant 2 bits of the 21-bit MEMSZ signal are always zero.

Referring to FIG. 2C, memory utilization within RAM-1 is illustrated by the data structure shown within block 240. The memory space of the RAM-1 unit 240 is subdivided into equally-sized buffer areas, each of length $L_M$. Buffer boundaries occur at memory locations having zeroes in their less significant digits. The location with the lowest address in the buffer for a given channel number, CHn, is referenced as CHn—00 and also as "a". The location with the highest address in the buffer for a given channel number, CHn, is referenced as CHn—$L'_M$ and also as "z". Length value $L_M$ is accordingly equal to the number of uniquely addressable memory locations in the memory block CHn—00 through CHn—$[L_M-1]$. The number of circular buffers defined in the RAM-1 unit 240 can be an integer value in the range one to 32. The maximum block length $L_M$ varies as a function of the storage capacity of memory unit 240 and of the number of channels (rounded to the next power of two, NCHS) that are to be serviced.

Individual data words stored within a circular buffer of RAM-1 unit 240 can be addressed by taking a corresponding channel number (CHN=0, 1, 2, ... , 1F), multiplying it by the maximum length value ($L_M$), and adding a positive offset having a value (—xx) which is less than $L_M$. Maximum length value, $L_M$, is preferably equal to an integral power of two in the range $2^2$ to $2^{20}$.

The VFC 275 (FIG. 2B) performs such a function. It generates an absolute start-of-buffer address (GAS) onto bus 276 when supplied with a current channel number (CHN) from pipeline register output bus 262 and a relative offset or "start pointer (SP)" from bus 266. VFAI 285 perpetuates this addressing scheme by performing an increment function which alters only the less significant V1 bits of the generated address signal (GAS) it receives from the VFC 275.

Each circular buffer area within the RAM-1 unit 240 is itself subdivided into an active region of length $L_{Cn}$ (where n is a channel number in the hexadecimal range 0–1F) and a free region of length $L_M - L_{Cn}$.

Consider area 241 of RAM 240 for example. Area 241 stores the circular buffer for channel number zero (CH0). The top most illustrated location of buffer area 241 (the location with the smallest address value in area 241) is referenced as relative location "a" or CH0—00 in absolute terms. The bottom most illustrated location of buffer area 241 (the location with the largest address value in area 241) is referenced as relative location "z" or CH)—[LM-1] in absolute terms.

If the filter length, $L_{C0}$, of channel CH0 is equal to four, the first request-servicing operation (Service No. 1) will write the newest sample value 114 (FIG. 1A) into location "a" and read out stored values from locations "b", "c", and "d". During Service No 1, the memory area 242 from location "e" to location "z" of the channel CH0 buffer area defines its free space. During Service No. 2, however, location "z" of buffer area 241 becomes the start-of-buffer and the first location written to. Then locations a, b and c are read. Locations d through y define the buffer free space during Service No. 2.

Immediately following location "z" of the channel CH0 buffer area 241, is the "a" location of the channel-1 buffer area 243. The channel-1 "a" location is also referenced as CH1-00. A filter length of $L_{C1}$ is assigned to buffer area 243. Filter length $L_{C1}$ can be the same or different from the filter length LC0 of the CH0 buffer area 241. Each buffer area 241, 243, etc. has a minimum filter length of four and a maximum length of $L_M(4 \leq L_{Cn} \leq L_M)$.

Upon initialization of the AG chip 270, each first channel-servicing of each channel begins with a write to respective channel location CHn—00 (location "a") in the buffer area of the channel. This is because of the reset (RST-1) applied to the SP's register file 265 upon initialization. It automatically sets the initial start-of-buffer pointers for all channels to their respective locations CHn—00 (for n=0 through NCHS-1).

For each subsequent request-service, the start-of-buffer location for the corresponding channel CHn is stepped backwards. In FIR-CBuff mode, the step backwards is usually by one location. In FFT-CBuff mode, the step backwards is channel-specific and can be one or more locations for a given channel.

Assuming that FIR-CBuff mode is active and the back step is always by one location, in a second servicing of any channel, CHn, location "z" of its respective buffer area becomes the position of the first write. A plurality of $L_{Cn}-1$ reads follow out of respective locations "a" "b" "c" etc in the same buffer area The start-of-buffer position steps backwards to locations "y", "x" "w" and so forth in subsequent, service operations. When it hits the "a" position, it wraps back around to the "z" position.

While a valid channel number (CHN) is presented on bus 262, the OL's register file 210 outputs a corresponding filter length (or overlap value), $OL_{Cn}$, onto 20-bit wide parallel bus 211. Bus 211 connects to the A-side decrementer 218, as mentioned earlier, and to an input of yet another multiplexer 217 (hereafter also referred to as the B-side update multiplexer 217). A second input of the B-side update multiplexer 217 receives the output 213 of register 212. Register 212 is referred to here as the alternate length/maximum length (ALM) register 212 because its contents represent either or both the maximum length $L_M$ of each buffer area, as already mentioned, or an alternate filter length value (AL). The alternate filter length value (AL) is used during FFT-CBuff mode in place of channel-specific buffer length values $L_{C0}-L_{Cn}$. When FFT-CBuff mode is active, the contents of OL's register file 210 represent channel-specific overlap values. The contents of the OL's register file 210 and the ALM register 212 are user-programmable.

Down-counter 289 is clocked by the local clock (LC). It counts a state variable SV down from the decremented value $L'_{Cn}$ (received in FIR-CBuff mode) or $L'_M$ (received in FFT-CBuff mode) down to zero, thus counting out a total of $L_{Cn}$ states (in FIR-CBuff mode) or $L_M$ states (in FFT-CBuff mode) and allowing an equal number of address signals to be output from the VFAI 285.

If the active channel request (ACR) line is at logic zero ("0") when SV approaches the 0 count, state controller 290 asserts sleep mode and indicates the mode on line 237. If sleep mode is asserted when the SV count reaches zero, SV remains at zero until the state controller recognizes a logic-true ACR signal 238 (FIG. 2A) and responds by deactivating sleep mode.

The increment enable line, INCREN, is held high during states where SV equals $L'_{Cn}$ through zero. INCREN goes low when the SV=0 state is entered. This halts an address incrementing function carried out in VFAI 285 at the output address corresponding to the SV=0 state.

The increment enable line INCREN does not necessarily remain low when the end of an address sequence for a given channel is reached. Down-counter 289 can be loaded with a new state value, SV=L'(Cn') corresponding to a new channel number Cn', Just as the state zero count (SV=0) for a previous channel, Cn, completes. A seamless transition of this sort occurs when the state control unit 290 detects a logic high condition on the ACR line during the SV=2 state. At the start of the SV=1 state, the state control unit 290 issues a LD-1 pulse to registers 260 and 234 (FIG. 2A). The new channel number, Cn' loads into register 260. The active channel request (ACR) loads into register 234. As state SV=0 completes for previous channel number Cn, the new length value $L'_{Cn'}$ for channel Cn' becomes valid at the output of multiplexer 215. A new generated address signal (GAS) for channel Cn' becomes valid at the output of the variable field commutator (VFC) 275.

The new $L'_{Cn'}$ count loads into down counter 289 at the end of the SV=0 state. The new generated address signal (GAS) loads into the VFAI 285 at the same time. (Unit 290 issues a LD-B signal to the VFAI 285.) The address sequence generating process for new channel number Cn' then begins in the very next clock cycle. Viewed from the start of service for channel Cn through the service of channel Cn', the state transition flow of the state control unit 290 follows a continuous sequence represented by:

$$SV=L'_{Cn}, \ldots 3, 2, 1, 0, L'_{Cn'}, 3, 2, 1, 0.$$

The INCREN line goes low only during state SV=0, as the switch over from the $L'_{Cn}$ countdown sequence to the succeeding $L'_{Cn}$ countdown sequence takes place. The seamless variable field address-incrementing unit (VFAI) 285 outputs a continuous stream of address signals. without skipping a clock cycle between channel servicings.

Decrementers 218 and 219 are optional. They are included to simplify user-programming of the overlap/-channel lengths (OL's) register file 210 and to simplify user-programming of the maximum length/alternate length (ALM) register 212. If decrementers 218 and 219 are not included on the AG chip 270, users must load values equal to one less than the actual filter lengths into the OL's register file 210 and a value equal to one less than the maximum filter length into the ALM register 212. A wrap-around handling portion of the start pointer update process also has to be modified as will become apparent shortly.

The start-of-buffer pointer (SP) in register file 265 for the current channel number Cn is updated in the first 3 cycles that register 260 loads with a new channel number value, Cn or Cn'.

In a local clock cycle prior to a first of the three update cycles, a data word in the SP's register file 265 is addressed and output.

In the first update cycle, subtracter/adder 268 is placed in a subtract mode to produce the result, C=A−B, where A and B are two 20-bit wide input ports of unit 268 and C is a 20-bit wide output port. The SP output signal then present on the F1 bus 266 moves through A-side multiplexer 267 to the "A" input port of subtracter/adder 268. At the same time, the F1 signal (bus 266) and CHN signal (bus 262) move through the VFC 275 to produce the corresponding generated address signal (GAS) that will load into the address-incrementing unit (VFAI) 285. The F1 signal loads into the VFAI 285 at the start of the second update cycle.

As this occurs during the first update cycle, a first pointer updating value simultaneously passes through B-side multiplexer 217 to the "B" input port of subtracter/adder 268. Subtracter/adder 268 produces a corresponding result at its "C" output port. This result is stored in accumulating register 269 at the end of the first update cycle. (The event is signalled by strobing a LD-3 line extending from logic unit 264 to register 269.) For the sake of simplicity, it will be assumed that the first pointer updating value is equal to positive one (+1). The B-side multiplexer 217 can alternatively select other values for the first pointer updating value. This option will be discussed later.

The "C" output port of subtracter/adder 268 feeds the data input port (DI) of the SP's register file 265. It also drives the input of a 20-bit wide accumulating register 269. A separate carry-out port (CY) of subtracter-/adder 268 connects by way of bus 239 to a plus/minus cross-over detecting input (+/−) of update control unit 264.

The output of accumulating register 269 connects to a second input of A-side multiplexer 267. The A-side and B-side multiplexers, 267 and 217, are respectively controlled by update-select signals, USEL-A and USEL-B, supplied from a 4-bit wide control bus of the update control unit 264.

The output of subtracter/adder 268 does not load into the SP's register file 265 in the second update cycle. Instead, unit 268 is placed into the add mode in the second cycle to produce the result, C=A+B. The accumulated result in register 269 circulates back through the A-side multiplexer 267 into the "A" input port of subtracter/adder 268. At the same time, the B-side multiplexer 217 is commanded (by the USEL-B signal from update controller 264) to select one of its four input lines as a second pointer updating value that is to be applied to the "B" input port of subtracter/adder 268. The selectable inputs of the B-side multiplexer 217 are: $L_M$, +1, 0, and the $OL_{Cn}$ value output by the OL's register file 210.

If the 0 input is selected, nothing happens and the result of register 269 is written into the register file 265 at the start of the third update clock cycle. The final result output from subtracter/adder 268 accordingly becomes SP=SP−1+0 at the end of the second update clock cycle.

If the +1 input of multiplexer 217 is selected during the second update cycle, the result output from subtracter/adder 268 at the end of the second update cycle is SP=SP−1+1 which equals the value of the start-of-buffer pointer SP originally output from register file 265 at the start of the first update cycle.

If the $OL_{Cn}$ value is selected during the second update cycle, the final result output from subtracter/adder 268 becomes SP=SP−1+$OL_{Cn}$ at the end of the second update clock cycle.

If the $L_M$ value is selected, the result output from subtracter/adder 268 becomes SP=SP−1+$L_M$ at the end of the second update clock cycle. This last operation is used to implement buffer-area address wrap-around as should occur, for example, when the start-of-buffer for the CH1 buffer area 243 (FIG. 2C) switches from the "a" location to the "z" location. If address CH1—00 is simply decremented by one, the new address points to the "z" location of the CHO buffer area 241; which is the wrong buffer area for servicing channel CH1. The plus/minus cross-over detecting input of update controller 264 detects a switch from a positive result to a negative result at the output of subtracter/adder 268 (e.g., from 0 to −1) and in response, update control unit 268 selects the $L_M$ input of multiplexer 217 during the second update cycle. This shifts the final result $L_M$ positions higher (one buffer area forward) and produces a pointer value correctly pointing to "z" location of the CH1 buffer area, 243.

At the start of the third update clock cycle, the LD-4 line is strobed by update control unit 264 and the value output by subtracter/adder 268 overwrites the SP value stored in location CHN of register file 265 during the third update cycle.

Figure 7:
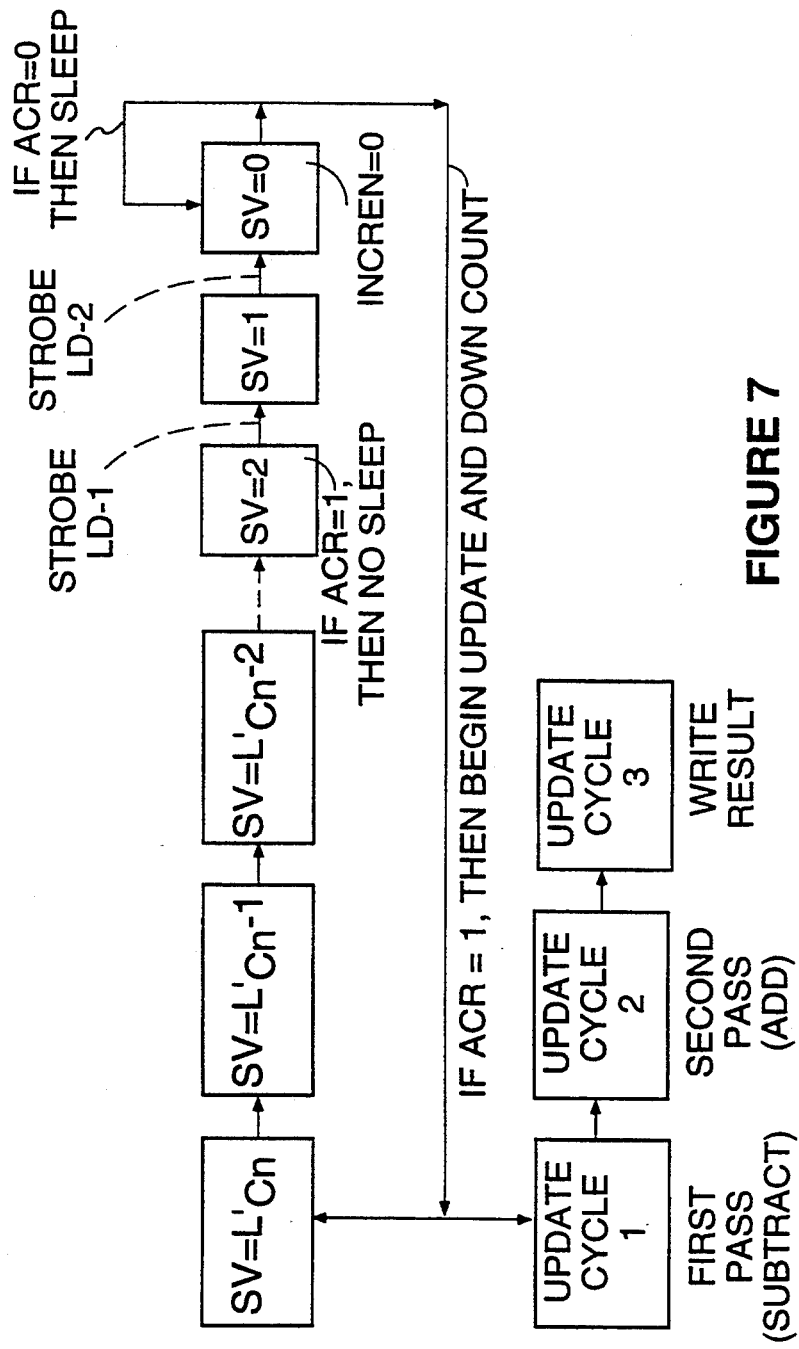
FIG. 7 is a partial state flow chart showing the SV=0 state and the transition to sleep mode or to a new $L'_{Cn}$ count.

In summary, the pointer update operation consumes three clock cycles as shown at the bottom of the state flow diagram of FIG. 7. The first cycle is used for reading out the current start pointer SP from register file 265 and making the first pass through subtracter/adder 268. Subtracter/adder 268 is in the subtract mode during the first pass. The second cycle is used for making the second pass through subtracter/adder 268. Subtracter/adder 268 is in the add mode during the second pass. The third update cycle is used for loading the new SP value into register file 265. Updating of the start-pointers register file 265 occurs concurrently with state-variable down-counting in down counter 289. Update cycle one, occurs concurrently with a state defined in FIG. 7 as $SV=L'_{Cn}$. Update cycle two occurs concurrently with a state defined as $SV=L'_{Cn}-1$. Update cycle three occurs concurrently with a state defined as $SV=L'_{Cn}-2$. (For $L'_{Cn}=3$, state $SV=L'_{Cn}-1$ becomes the same as state $SV=2$ and state $SV=L'_{Cn}-2$ becomes the same as state $SV=1$.)

The minimum filter length for each channel is specified as 4 because it takes 3 cycles to complete an SP update operation and the next highest power of two is the number four. This is not considered an undue constraint because most FIR filters have a filter length of much greater than 4.

The maximum rate at which service requests can be processed by the AG chip 270 is determined either by the update overhead (4 cycles per request) or if larger, the filter lengths of the various channels. It takes $L_{Cn}$ clock cycles to service a channel CHn having a filter length of $L_{Cn}$.

The AG chip 270 is said to be in an overlap mode when B-side multiplexer 217 couples the OL bus 211 to the "B" input port of subtracter/adder 268 during the first update cycle. (FFT-CBuff mode includes the overlap mode.) The output of OL's register file 210 is then referred to as the overlap value $OL_{Cn}$ for the current channel, Cn. Multiplexer 215 is preferably operated to select the output of decrementer 219 as the source of the actual filter length $L_{Cn}$ when the overlap mode is active. The same value also serves as the maximum buffer length $L_M$. In such a case, the filter length $L_{Cn}$ remains constant for all channels and it is the same as the maximum buffer length, $L_M$. The overlap value, OL, can change, however, from channel to channel.

The output of the variable field commutator (VFC) 275 loads into the address-incrementing unit 285 either just as the SV=0 count for a previous channel completes or, if there is no active channel request (ACR) pending, after register 260 loads with a new channel number and VFC 275 produces the corresponding generated address signal (GAS).

A wrap-around handling mechanism is provided for the VFAI 285 just as one is provided for the SP update function. Assume that location "w" is the start-of-buffer for a given channel servicing operation and the filter length is greater than four. As the address signals output from the VFAI 285 sequence through relative locations x, y, and z of the channel buffer area (e.g. 243), the last location CHn—$L'_M$ of the buffer area is reached. At this point, the address-incrementing unit 285 has to wrap around back to the "a" position at the top of the same buffer area (e.g. 243). Comparator 206 detects coincidence with address value CHn-$L'_M$ and it sends a variable width reset signal 287 to the address-incrementing unit 285 at that time. Transition from the output of the CHn—$L'_M$ address signal to the output of the CHn—00 address signal is seamless. The latter occurs in the clock cycle immediately following that of the former.

Figure 3:
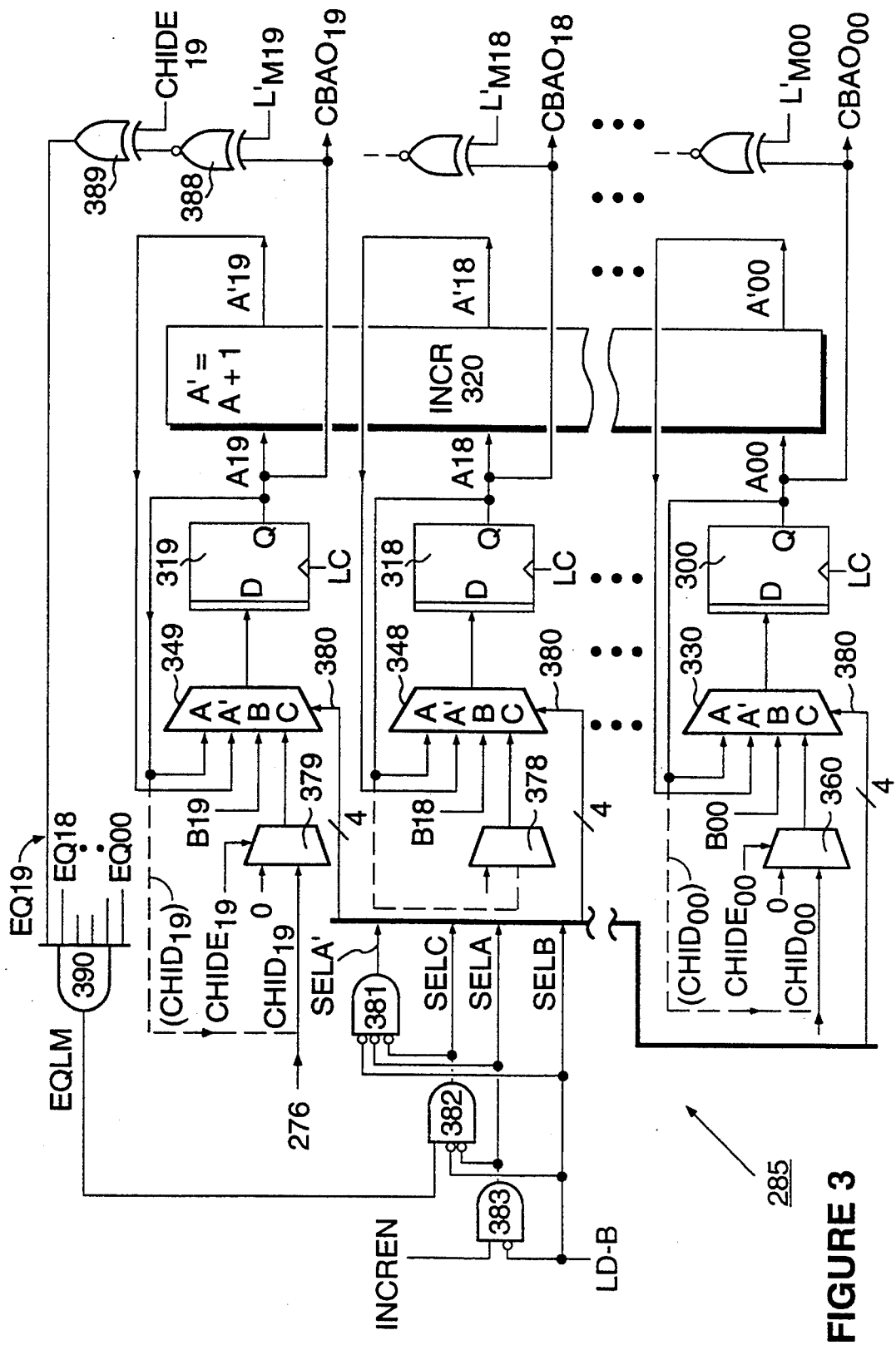
FIG. 3 is a detailed schematic of a seamless variable-field address incrementor (VFAI) such as shown in FIG. 2B.

FIG. 3 shows an embodiment of a seamless variable field address-incrementing unit 285 in more detail. A set of twenty flip flops, 300, 301 (not shown), ... 318, and 319 store respective bits A00, A01 (not shown), ..., A18, and A19 of the current circular buffer address output (CBAO). Each of these devices, 300–319, is a synchronous D-type flip flop clocked by the local clock (LC). The Q outputs of flip flops 300–319 couple to the input of a 20-bit wide incrementor (INCR) 320. Incrementor 320 is a combinatorial logic block which produces the 20-bit wide output signal A' representing the input value, A, plus one. (A'=A+1.) The individual bits of the incrementor output, A', are respectively labeled A'00 through A'19.

A plurality of twenty 4-input wide multiplexers, 330 through 349 (not all shown), are provided with the output of each multiplexer 330-349 coupled to the D input of a corresponding flip flop in the series 300–319. Each of multiplexers 330-349 is also referred to as a flow-control multiplexer.

The four inputs of each of multiplexers 330-349 are labeled A, A', B and C Connections made at the inputs of flow-control multiplexer 349 are illustrated as exemplary of the connections made at the other multiplexers 330-348. The A-input of multiplexer 349 connects to the Q output of flip flop 319. The A' input of multiplexer 349 connects to the A'19 output of incrementor 320. The B input of multiplexer 349 receives bit B19 from the VFC bus 276. The C input of multiplexer 349 receives either a zero or channel identification bit (CHID$_{19}$) from an associated channel-preserving multiplexer 379. There are twenty channel-preserving multiplexers in total, 360 through 379, one for each of the flow-control multiplexers, 330 through 349.

A 4-bit wide control bus 380 controls the operations of each of the flow-control multiplexers 330–349. Control bus 380 has four mutually-exclusive modes, respectively labeled as SELA', SELC, SELA and SELB.

The bus 380 modes are prioritized according to the following low-to-high order: SELA' SELC SELA and SELB. A low-priority mode is overridden by activation of a higher priority mode.

The SELA' mode remains active unless one of the other modes, SELC, SELA or SELB is activated.

When active, the SELA' mode puts the address-incrementing unit 285 into an auto-increment mode. Incrementor output A'19 passes through data-flow multiplexer 349 and loads into flip flop 319 at the start of each clock cycle. The output A19 of flip flop 319 therefor increments every clock cycle. AND gate 381 generates the SELA' signal. Gate 381 has three inverting inputs respectively coupled to the SELC line, SELA line and SELB line. If any one of SELC, SELA and SELB becomes active (logic "1"), SELA' becomes inactive (logic "0"). Otherwise SELA' remains active (logic "1").

The SELC mode loads either a zero or a corresponding channel identification bit into each of flip flops 300–319 in the clock cycle following one where a limit equality condition (EQLM=1) is encountered. In one embodiment, represented by the dashed connection from the Q output of flip flop 319 to an input of multiplexer 379, the channel-preserving multiplexer 379 returns the A19 output to the C input of multiplexer 349 if a corresponding channel identification enable control bit (CHIDE$_{19}$) is active. Otherwise it passes a logic "0" to the C input of multiplexer 349. It will be seen later that the returned A19 bit is the same as a channel identification bit, CHID$_{19}$, earlier passed from the VFC 275 into the VFAI 285 through the B input of multiplexer 349. Hence the nonzero input of multiplexer 379 is parenthetically labeled as "(CHID$_{19}$)".

In a second embodiment of VFAI 285, the dashed-parenthetical (CHID$_{19}$) connection is left out and the CHID$_{19}$ bit is picked off by multiplexer 379 directly from the generated address signal ,(GAS) bus 276. In this second embodiment, the channel.-identification portion DF2 of the VFC output has to remain constant as long as the VFAI 285 is still servicing the same channel. Referring back to FIG. 2B, this can be accomplished by keeping the CHN output 262 of pipeline register 263 constant while the VFAI 285 is busy servicing the needs of a given channel.

Limit equality is detected as follows. Twenty exclusive-NOR gates (XNOR's) are provided, one at the output of each of flip flops 300–319. The A19 output bit of flip flop 319, for example, connects to one input of exclusive NOR gate 388. The other input of exclusive NOR gate 388 receives a corresponding modified limit bit L'$_{M19}$ from decrementer 218 (FIG. 2B). XNOR gate 388 accordingly compares address bit A19 against limit bit L'$_{M19}$. Similar connections are made at the other XNOR gates for comparing each address bit An against limit bit L'$_{Mn}$.

No comparison is made at bit locations where a channel-identification bit CHID$_n$ is inserted/preserved (either by the VFC 275 or by one of preserving multiplexers 360–379). Twenty comparison-override OR gates are provided, one for each XNOR gate. By way of example, it is seen that the output of XNOR gate 388 couples to one input of OR gate 389. OR gate 389 outputs an equality-indicating signal EQ19 to a wide-input AND gate 390. EQ$_{19}$ goes high ("1") under two alternative conditions. One is if CHIDE$_{19}$=0 and A$_{19}$=LM$_{19}$. The second condition is if CHIDE$_{19}$=1. The EQ$_{19}$ signal goes high in the second condition regardless of the relationship between A$_{19}$ and L$_{M19}$.

Similar combinations of XNOR gates and OR gates (388 and 389) are provided for each of the other outputs A00–A18 of the address-incrementing unit 285. The wide-input AND gate 390 receives their corresponding equality-indicating signals, EQ00–EQ18. If all of EQ0-EQ19 are at logic "1" the wide-input AND gate 390 outputs a logic high EQLM signal to a noninverting input of AND gate 382. The output of AND gate 382 drives the SELC line. AND gate 382 has two inverting inputs respectively coupled to the SELA and SELB lines. SELC goes active if the EQLM line goes high and neither of the SELA and SELB modes is active.

The SELA line is driven by the output of AND gate 383. AND gate 383 has a noninverting input coupled to the increment enable line (INCREN) and an inverting input coupled to the SELB line. SELA becomes active if INCREN is raised high and the SELB mode is not active. When SELA mode is active, the Q output of each flip flop 300–319 feeds through its corresponding data-flow multiplexer 330–349 back to its D input. The output data of VFAI 285 remains the same one clock cycle after the next in this mode.

The SELB line is driven by the LD-B output of state controller 290. Whe the SELB mode is active, the corresponding generated address (GAS) bit (B19, B18, ... , B00) of bus 276 passes through data-flow multiplexers 330–349 to the D input of the corresponding flip flop 300–319 and loads into the flip flop at the beginning of the next clock cycle.

Generated address (GAS) bits, B19, B18, ... , B00, are produced in the VFC 275. The variable field commutator 275 is composed of twenty cells, cell-00 through cell-19. Each cell (cell-xx) produces a corresponding bit (Bxx) of bus 276.

Figure 4A:
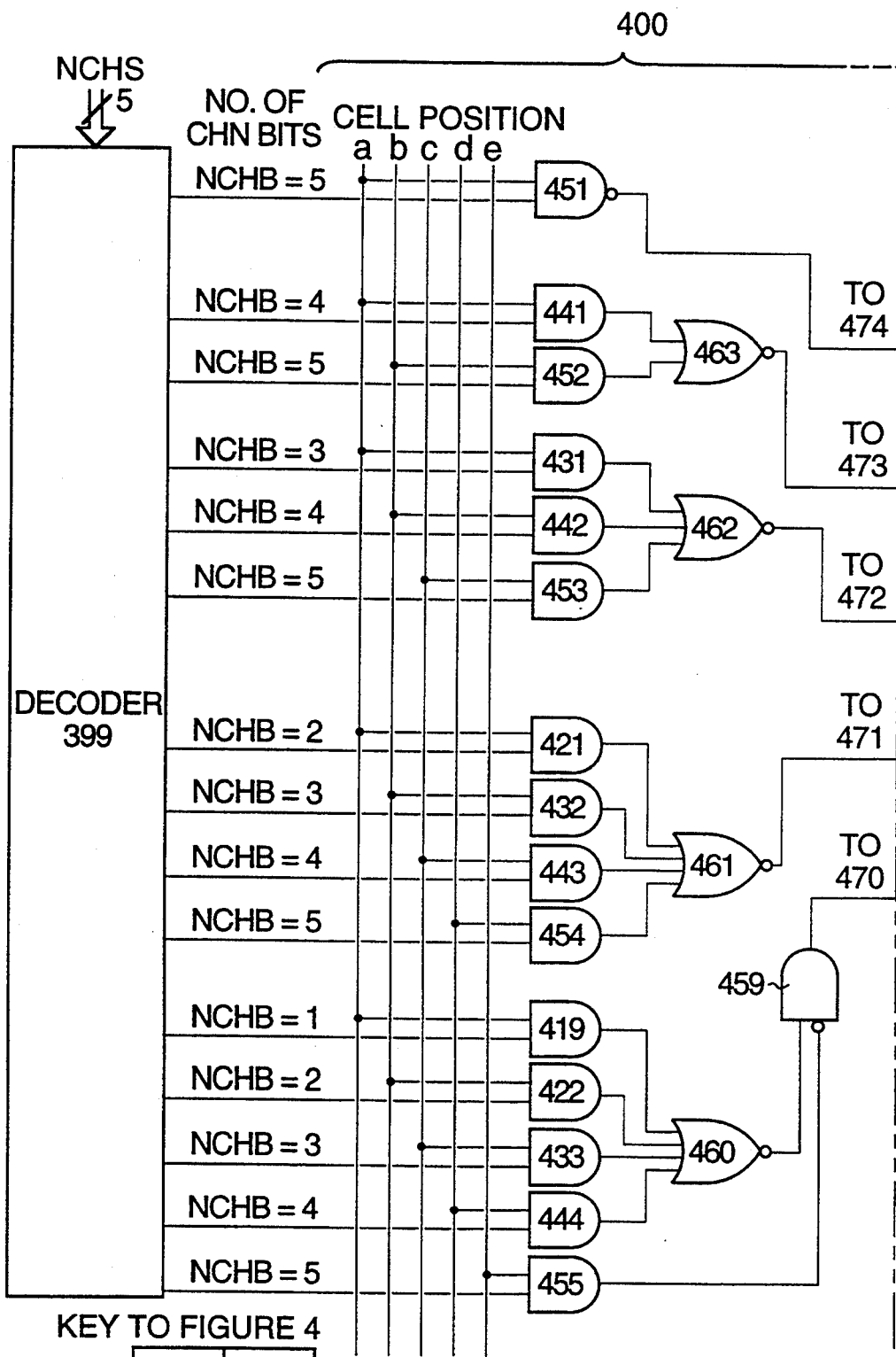
FIGS. 4A and 4B in combination show a single commutator cell.
Figure 4A:
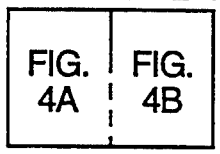
Figure 4B:
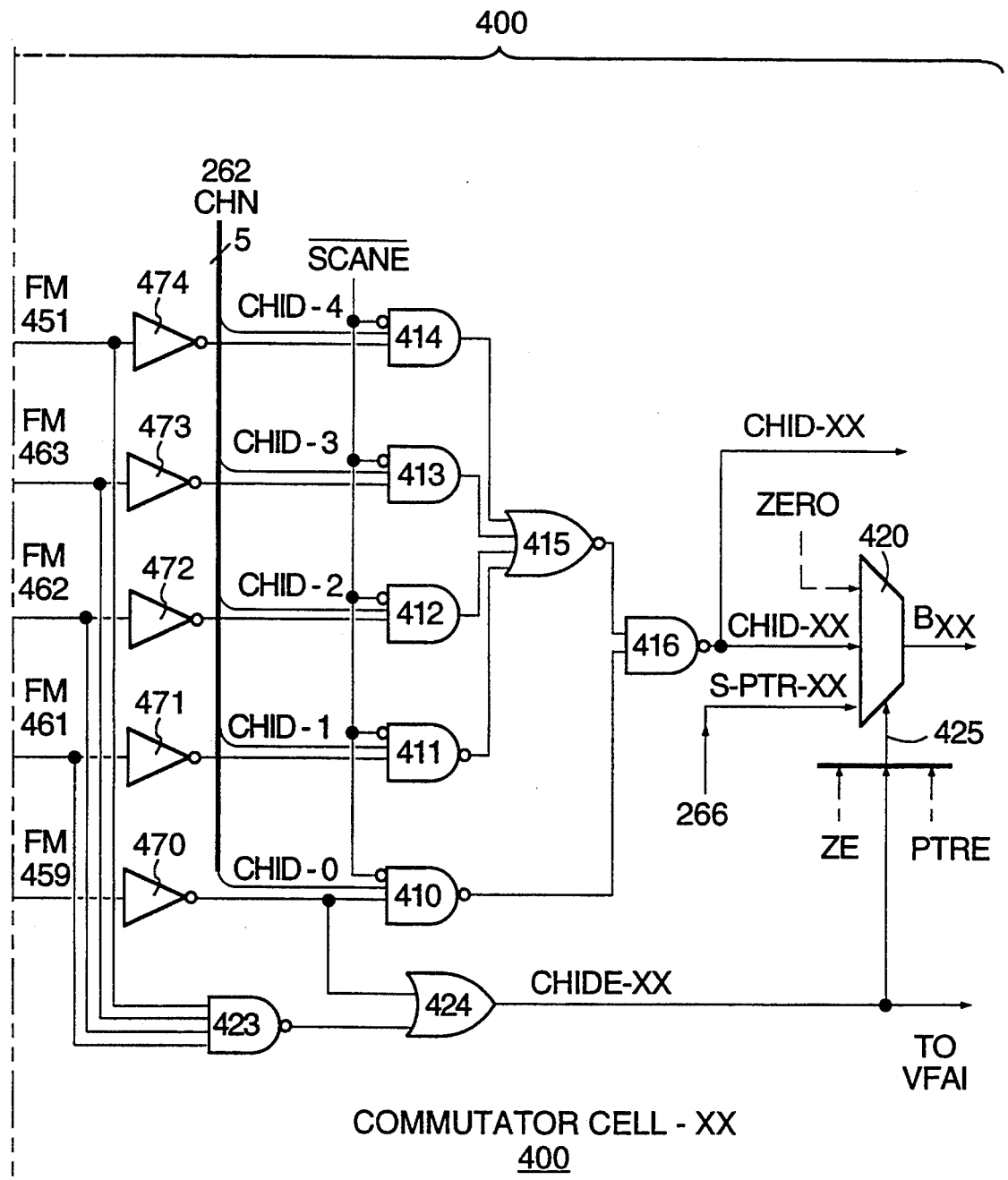

FIGS. 4A and 4B in combination shows the internal structure of a generic commutator cell 400. Each of commutator cell-00 through cell-19 has the same structure as that shown for generic cell 400. Cell 400 is also referenced as cell-xx.

Decoder 399 is common to all the commutator cells in VFC 275. It has five output lines respectively labeled, NCHB=5, NCHB=4, NCHB=3, NCHB=2, and NCHB=1. Each of the decoder output lines, NCHB=1 through NCHB=5, connects to each of the twenty commutator cells, cell-00 through cell-19. Segments of decoder output lines NCHB=1 through NCHB=5 are shown at plural locations in FIG. 4A for the sake of simplified explanation. It is understood that the segments labeled NCHB=5 are all part of one NCHB=5 line.

Decoder 399 receives a 5-bit wide signal, NCHS, which is binary encoded to indicate the number of buffer areas available for the DSP process. The output of decoder 399 indicates the minimum number of bits necessary for representing a given channel. If the number of channels to be serviced is between 17 and 32, the NCHB=5 decoder output line goes high to indicate that the number of required channel bits is 5. If the number of channels to be serviced is between 9 and 16, the NCBH=4 output line goes high. If the number of channels to be serviced is between 5 and 8, the NCBH=3 output line goes high. If the number of channels to be serviced is 3 or 4, NCHB=2 goes high. If the number of channels to be serviced is 2, NCHB=1 goes high. If there is only one channel being serviced, no channel bits are required for identifying that one channel and all of decoder output lines NCHB=5 through NCHB=1 are held low to indicate that the number of channel bits is zero.

When five bits are to be used for representing a channel number (NCHB=5 is true), the five bits are assigned respective position designators: a, b, c, d, and e in most to least significant order. Each commutator cell 400 is assigned a cell position corresponding to the position of a channel identification bit (CHID-xx) it will output. The CHN bus 262 carries five channel identification bits, respectively: CHID-4, CHID-3, CHID-2, CHID-1 and CHID-0 in most to least significant order.

If NCHB=5 is true, a commutator cell which is assigned to cell position "a" will output the most significant channel identification bit, CHID-4. A commutator cell assigned to position "b" will output the next significant bit CHID-3. A cell assigned to position "c" will output CHID-2. A cell assigned to position "d" will output CHID-1. A cell assigned to position "e" will output CHID-0.

If the number of channel bits is four (NCHB=4 is true), only the four less significant bits, CHID-3 through CHID-0 will be used to fill respective bit positions a, b, c, and d. Similarly, if the number of channel bits is three, CHID-2 through CHID-0 fill respective bit positions a, b and c. If the number of channel bits is two, bit positions a and b are filled respectively by CHID-1 and CHID-0. When there is only one channel bit, CHID-0 fills the one bit position, a.

Referring to FIG. 4B, AND gates 410 through 414 respectively steer one of the channel identification bits, CHID-0 through CHID-4 by way of NOR gate 415 and NAND gate 416 into the CHID-xx input of multiplexer 420.

In a preferred embodiment, multiplexer 420 has only two inputs, CHID-xx and S-PTR-xx, and one output referenced as Bxx. In an alternate embodiment, multiplexer 420 has a third input shown by the dashed ZERO connection. Control bus 425 selects one of the inputs of multiplexer 420 as its output, Bxx. In the two-input embodiment of multiplexer 420, the CHIDE-xx line extending from OR gate 424 defines the control bus 425. If the CHIDE-xx line 425 is high (logic "1"), multiplexer 420 passes the CHID-xx input signal to its output. If the CHIDE-xx control line 425 is low (logic "0"), multiplexer 420 passes its S-PTR-xx input signal to its output. The S-PTR-xx signal is picked off as one of the corresponding twenty bits on the SP bus 266 (FIG. 2B).

For the three-input embodiment of multiplexer 420, additional control lines, ZE and PTRE, are provided in control bus 425 for respectively selecting the ZERO and S-PTR-xx inputs as the outputs of multiplexer 420. It will be recalled that the VFC 275 (see FIG. 2B) generates three data fields, DF1, DF2 and DF3, of respective variable bit widths V1, V2 and V3, where the DF3 data field contains an appropriate number of zeroes. The ZERO input is not needed on multiplexer 420, however, because upper bits of the F1 input field which are not used for identifying a start-of-buffer location are automatically loaded with zeroes through the action of the RST signal, and they are maintained at zero through the action of the plus/minus cross-over detecting portion of update control unit 264. If the CHIDE-xx enable line is low, the S-PTR-xx line brings the appropriate zero bit or start-of-buffer pointer bit to the output of multiplexer 420. Hence, a two-input version of multiplexer 420 is sufficient for generating a bit in any one of the DF1, DF2 and DF3 data fields.

The CHIDE-xx control line at the output of OR gate 424 goes high ("1") if any one of the steering AND gates 410-414 is activated to steer one of its corresponding CHID-x bits to multiplexer 420. One input of OR gate 424 is connected to the activating line for steering AND gate 410. A second input of OR gate 424 is coupled to the output of NAND gate 423. NAND gate 423 has four inputs respectively coupled to inverted versions of the control signals which activate AND gates 411–414. An inverted scan enable line, $\overline{\text{SCANE}}$, connects to inverting inputs of AND gates 410–414 for deactivating all of them during a scan test mode.

As seen in FIG. 4A, a first NAND gate 451 is provided with a first input coupled to the "a" cell position line and a second input coupled to the NCHB=5 decoder output line. The output of NAND gate 451 connects by way of inverter 474 to the activating input of steering AND gate 414. If NCHB=5 is true and the cell position is "a", the output of inverter 474 goes high and the CHID-4 bit is steered by way of AND gate 414 to the CHID-xx input of multiplexer 420.

If NCHB=5 is true and the cell position is "b" this activates another AND gate 452 which has its inputs coupled to these respective NCHB and cell position lines. The output of AND gate 452 passes by way of NOR gate 463 and inverter 473 to the activating input of AND gate 413. When the output of AND gate 452 goes high, the CHID-3 bit is steered by way of AND gate 413 to the CHID-xx input of multiplexer 420.

In similar fashion, another AND gate 453 is provided with its inputs coupled to the NCHB=5 line and the cell position "c" line for steering CHID-2 to the CHID-xx input of multiplexer 420 when the inputs of AND gate 453 are true. In like fashion, another AND gate 454 is provided with its inputs coupled to the NCHB=5 line and cell position "d" line. Another AND gate 455 is provided with its inputs coupled to the NCHB=5 line and the cell position "e" line.

AND gates 441 through 444 provide steering control for the condition where NCHB=4 is true (at logic high) and one of respective cell positions a, b, c, and d is true. AND gates 431—433 provide steering control for the condition where NCHB=3 is true and one of cell positions a, b and c is true. AND gates 421 and 422 provide steering control for the case where NCHB=2 is true and one of cell positions "a" and "b" is true. AND gate 419 provides steering control for the case where NCHB=1 is true and cell position "a" is true.

NOR gate 463 receives the outputs of AND gates 441 and 452. The output of NOR gate 463 passes by way of inverter 473 to the activating input of AND gate 413. NOR gate 462 receives the outputs of AND gates 431, 442 and 453. The output of NOR gate 462 passes by way of inverter 472 to the activating input of AND gate 412. NOR gate 461 receives the outputs of AND gates 421, 432, 443 and 454. The output of NOR gate 461 passes by way of inverter 471 to the activating input of AND gate 411. NOR gate 460 receives the outputs of AND gates 419, 422, 433 and 444. The output of NOR gate 460 passes by way of AND gate 459 and inverter 470 to the activating input of AND gate 410. AND gate 459 has an inverting input coupled to the output of AND gate 455.

Figure 5:
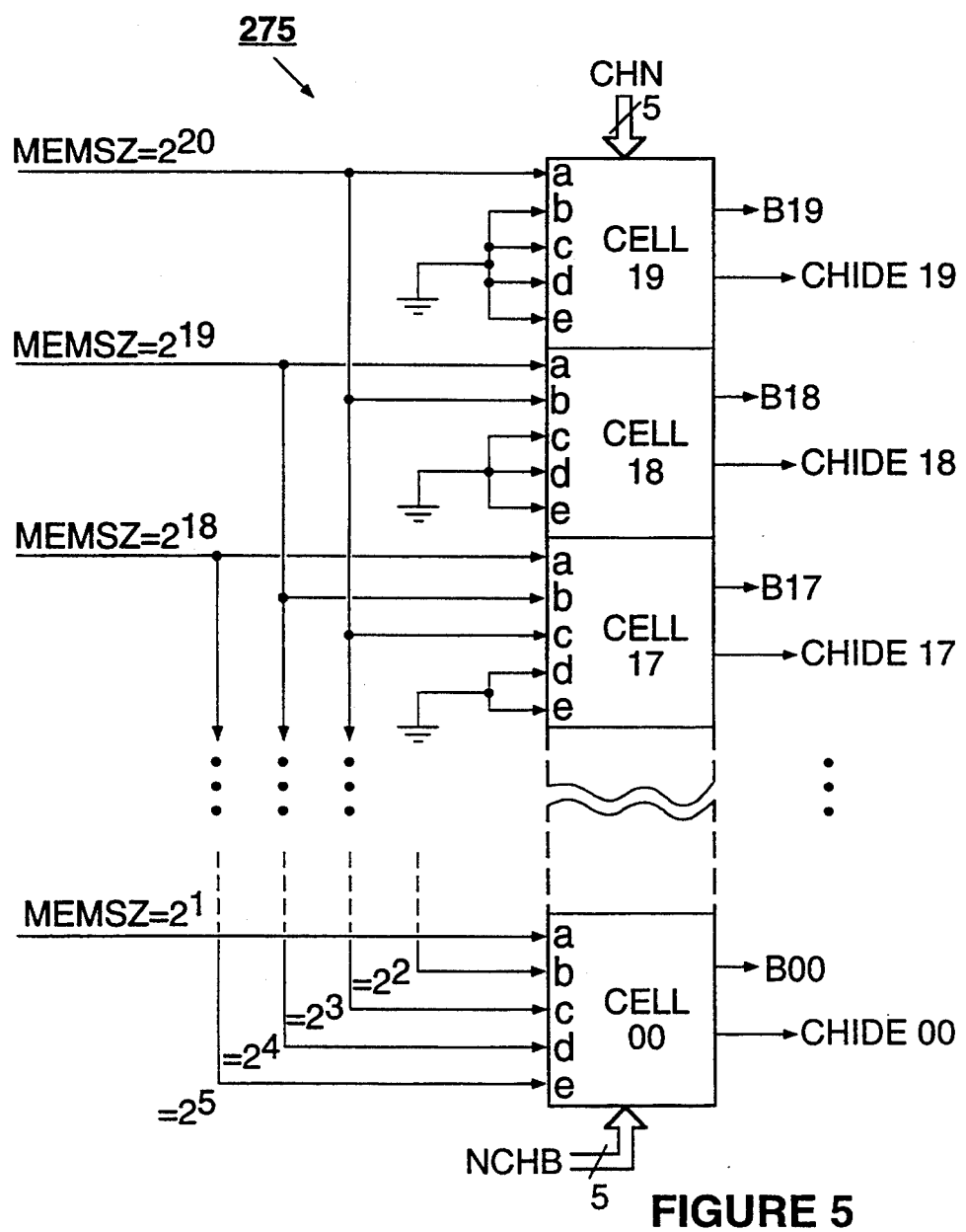
FIG. 5 shows how a plurality of commutator cells combine to form a variable field commutator (VFC).

FIG. 5 shows how multiple commutator cells are ganged together to produce an embodiment of the variable field commutator 275. Each of commutator cells 00 through 19 is shown to have five cell position inputs respectively labeled as "a" through "e".

Memory-size indicating line MEMSZ=$2^{20}$ connects to the "a" cell position input of cell-19, to the "b" cell position indicating input of cell-18, to the "c" cell position indicating input of cell-17, and although not shown, to the "d" cell position input of cell-16 and the "e" position input of cell-15. The "b" through "e" cell position inputs of cell-19 are grounded (set to logic "0"). The "c" through "e" inputs of cell-18 are similarly grounded. The "d" and "e" inputs of cell-17 are also grounded, and while not s, hown, it is to be understood that the "e" input of cell-16 is also grounded.

A MEMSZ=$2^{19}$ line connects to the cell position "a" input of cell-18, to the position "b" of cell-17, the "c" input of cell-16 (not shown), the "d" input of cell-15 (not shown) and the "e" input of cell-14 (not shown). Similarly, a MEMSZ=$2^{18}$ indicating line connects to the "a" input of cell-17, to the "b" input of cell-16, to the "c" input of cell-15 and so forth.

At the bottom of the stack, cell-00 has a MEMSZ=$2^1$ indicating line coupled to its "a" cell position input. The "b" cell position of cell-00 connects to the MEMSZ=$2^2$ line. The "c" input of cell-00 connects to the MEMSZ=$2^3$ line. The "d" input of cell-00 connects to the MEMSZ=$2^4$ line. The "e" input of cell-00 connects to the MEMSZ=$2^5$ line.

Lines MEMSZ=$2^2$ through MEMSZ=$2^{20}$ are driven by the 19 output bits of MEMSZ register 204 (FIG. 2B). The MEMSZ=$2^1$ line is grounded and the MEMSZ=$2^0$ is not actually present within the circuit (it is hypothetical).

Only one of the MEMSZ indicating lines output from register 204 is raised high at a timE:. If the MEMSZ=$2^{20}$ line is raised high and the number of channel bits is greater than zero, cell-19 outputs the "a" positioned bit of the channel data field (DF2) on its output line B19. The corresponding CHIDE19 enable line is also raised high to indicate that a channel identification bit is present on line B19. Cell-19 cannot act as the output for a "b" channel bit or a "c" channel bit or a "d" channel bit or a "e" channel bit because it is the uppermost cell in the stack. If the MEMSZ=$2^{20}$ indicating line goes low, the B19 and CHIDE19 output lines of cell-19 both go low.

If MEMSZ=$2^{20}$ is high and the number of channel bits is greater than one, cell-18 outputs the "b" bit from the channel data field (DF2). If the number of channel bits is three or more, cell-17 outputs the "c" bit of the channel data field, DF2. If the number of channel bits is four or more, cell-16 outputs the "d" bit of the DF2 field. If the number of channel bits is five, cell-15 outputs the "e" bit of the DF2 field.

Similarly, when MEMSZ=$2^{19}$ is raised high, cell-18 functions as the bit position "a" output of the DF2 field, cell-17 functions as the "b" bit position output of the DF2 field, and so on. The MEMSZ lines are hardwired to the cell position inputs of each of commutator cells 00 through 19 to indicate to each when that cell is required to insert a channel identification bit (CHID-xx) into the generated address signal (GAS), and if so, which channel identific. ation bit (CHID-0 through CHID-4) to insert. The CHIDE control outputs of the VFC 275 instruct the preserving multiplexers 360–379 (FIG. 3) of the following VFAI whether to insert a zero or use the corresponding channel identification bit upon the-detection of a limit condition (EQLM=1).

Figure 6:
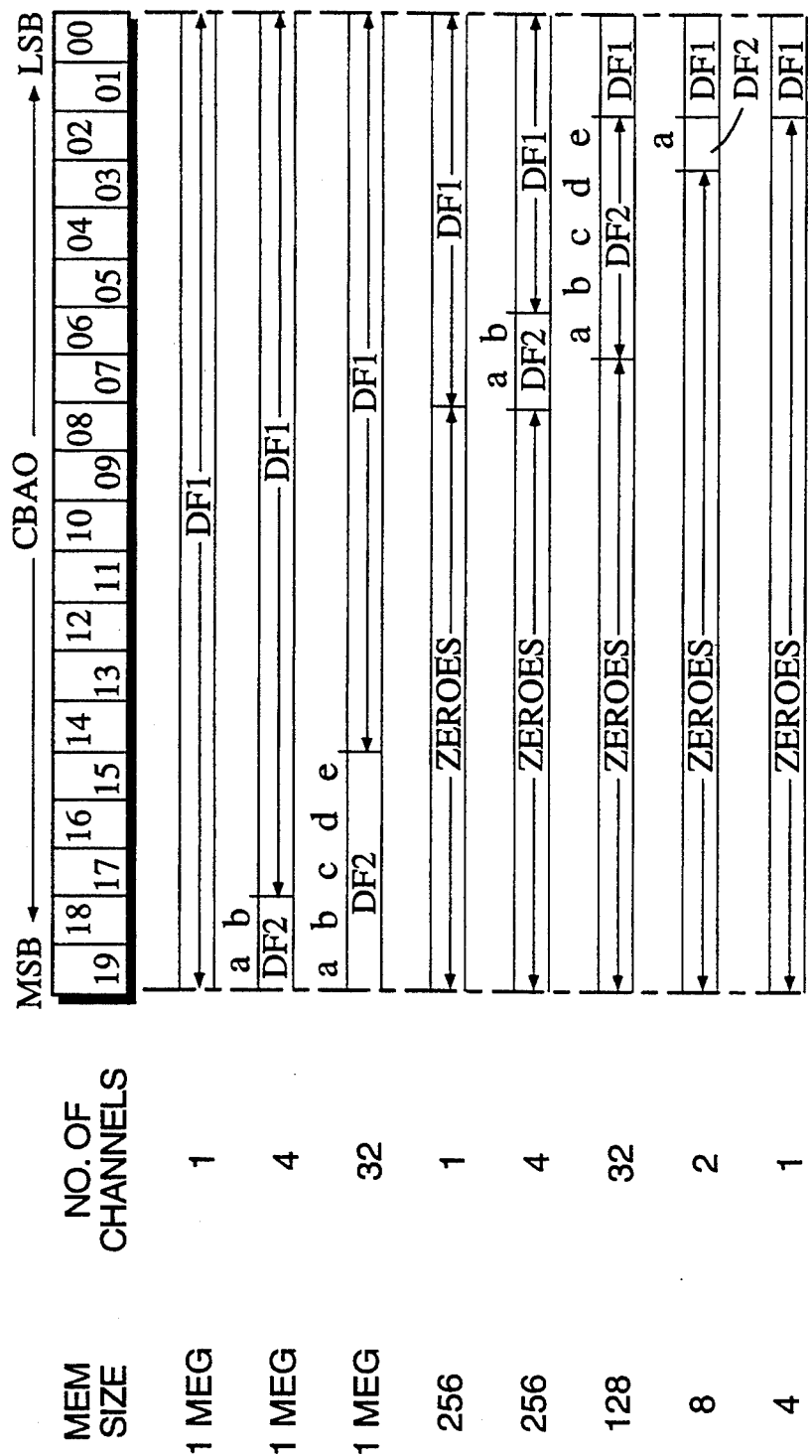
FIG. 6 diagrams a number of different memory size and channel number configurations which can be handled by the disclosed system.

Ease of use arises from the above described mechanisms for automatic insertion and preservation of channel identification bits at positions corresponding to the memory size of the DSP system and to the number of channels being serviced. FIG. 6 shows examples of various environments in which the AG chip 270 may be used. The size of RAM unit 240 can vary anywhere from one megaword ($2^{20}$ datawords) to four datawords. The number of channels can range anywhere from 1 to 32.

If a user of the AG chip 270 wishes to use the same printed circuit board but install memory devices 240 of varying storage capacity, the field commutating function of the chip 270 makes it possible to simply insert a different memory device without having to rewire the printed circuit board or provide a new one. Address bits automatically route to the appropriate memory device address lines once the correct MEMSZ and NCHS specifications are loaded into registers 204 and 201 (FIG. 2B).

In FIG. 6, the circular buffer address output bits are respectively referenced as CBAO-19 through CBAO-00 in most to least significant order. If memory size is equal to one megaword and only one channel is to be used, the pointer data field, DF1, occupies the full 20 bits of the CBAO field, as shown in the top configuration of FIG. 6.

If memory size is one megaword and 4 channels are to be used, the two most significant bits CBAO-19 and CBAO-18 define respective bits "a" and "b" of the channel identification data field, DF2. The relative buffer position pointing field, DF1, occupies the remainder of the CBAO field. If memory size is one megaword and 32 channels are to be used, the most significant five bits of the CBAO field serve as respective bits "a" through "e" of the DF2 field while the DF1 field occupies the remainder of the CBAO field. Note that there is no zero-fill field, DF1, in the case where memory size is one megaword.

If memory size is reduced, say to 256 datawords, the zeroes field (DF3) occupies a major upper portion of the CBAO field. If there is only one channel, the DF1 field occupies the least significant eight bits of the CBAO field. If there are four channels, CBAO bits 07 and 06 become the "a" and "b" bits of the DF2 field while bits 05–00 define the DF1 field.

For the case of 32 channels and only 128 datawords of memory storage, CBAO bits 06 through 02 respectively define the "a", "b", "c", "d" and "e" bits of the channel identifying field, DF2. CBAO bits 01 and 00 then define the relative address field, DF1. The upper end of the CBAO field is filled with zeroes.

Memory size can be decreased to a minimum of four datawords, but data usage is then restricted to one channel because the minimum filter length of a channel is four. In such a case, the zero-padding field DF3 consumes CBAO bits 19 through 02. The relative address field, DF1, then consumes CBAO bits 01 and 00.

It is seen from the above that the respective bit widths, V1, V2 and V3 of respective data fields DF1, DF2 and DF3 change as a function of the system environment. The AG chip 270 can be used in systems having different memory capacities and different numbers of serviced channels. Multiple channels can be handled on a priority basis. Each channel can operate at an independent sampling rate (which can go as high as one-fourth the chip clock frequency). Each channel can be assigned either its own independent filter length (in FIR-CBuff mode) or an independent overlap value (in FFT-CBuff mode). Operations in the chip are pipelined to provide for seamless switchover from the servicing of one channel request to the servicing of a next channel request.

The above disclosure is to be taken as illustrative of the invention, not as limiting its scope or spirit. Numerous modifications and variations will become apparent to those skilled in the art after studying the above disclosure.

By way of example, where available die area allows, pin counts, bus widths and register sizes can be increased to handle a larger number of channels, say 64 instead of 32. Pin counts, bus widths and register sizes can also be increased to handle larger sized memory units having for example, 21 or more address input lines instead of 20. Alternatively pin counts, bus widths and register sizes can be reduced for cases where say, no more than 16 channels have to be serviced at any one time or where the largest expected memory unit will have less than 20 address input lines. Operating speeds can be increased above 40 MHz where technology so allows. Technologies other than silicon-based CMOS can be used for implementing the AG chip. Examples of other technologies include TTL, ECL and the use of III-V semiconductor compounds.

While the number of address signals output in response to a given service request is sometimes referenced as a "filter length" $L_{Cn}$ in the above description, when taken in the context of an FIR filter, it is to be understood that the channel-specific sequence count or length value, $L_{Cn}$, and/or overlap value, $OL_{Cn}$, is attributable to other digital signal processing (DSP) algorithms, including correlation and adaptive signal processing.

Multi-channel circular-buffering finds many uses. Image data can be collected and presented to a system incorporating a DSP chip and the disclosed address generator chip for analysis by one or two dimensional correlation. Machine vision can be realized by searching through large image databases to find objects which best correlate or correlate relatively closely to an input image signal. Each correlation is assigned its own channel and multiple correlations are carried out concurrently to shorten search time.

In the field of adaptive signal processing, a similar approach is used. The same input data is applied to a plurality of different DSP algorithms to find the algorithm that works best. Each algorithm is treated as if it were a separate channel. The DSP resources of the processing chip are multi-tasked across the various algorithms (channels) in a manner which is transparent to the end user, even if each channel or algorithm has an independent sample rate. An economically practical, easy to use system is provided for handling even relatively complex digital signal processing tasks.

Given the above disclosure of general concepts and specific embodiments, the scope of protection sought is to be defined by the claims appended hereto.

What is claimed is:

1. An address generator for generating address sequences for application to a memory containing a plurality of circular buffers, each circular buffer being for storing sequential data received from a corresponding one of a plurality of data supply channels, the address generator comprising:
   (a) request receiving means for receiving at a given time, one or more service requests from a corresponding one or more of the plural data supply channels;
   (b) request prioritizing means, coupled to the request receiving means, for selecting as active a highest prioritized one of plural service requests when more than one service requests are received simultaneously by the request receiving means and for selecting as active the received one service request when just one service request is received; and
   (c) address sequence outputting means, coupled and responsive to the request prioritizing means for automatically outputting a sequence of addresses corresponding to the circular buffer of service request selected as active by the prioritizing means.

2. The address generator of claim 1 further comprising:
   (d) an integrated circuit chip on which the prioritizing means and address sequence outputting means are defined.

3. The address generator of claim 2 wherein the integrated circuit chip further comprises:
   (d.1) clock receiving means for receiving a series of local clock pulses and for producing therefrom an on-chip clock signal; and
   (d.2) synchronizing means for receiving service requests from off-chip sources and synchronizing the received service requests to the on-chip clock signal;

and further wherein the address sequence outputting means includes:
   (c1) start pointer memory means for storing a plurality of sequence start pointers, each designating a sequence starting point for a corresponding one of the plural circular buffers; and
   (c.2) start pointer updating means, synchronized to the on-chip clock signal and coupled to the start pointer memory means, for changing the start pointer of the corresponding circular buffer of each active one of the synchronized service requests in sychronism with said on-chip clock signal.

4. The address generator of claim 2 wherein the integrated circuit chip further comprises:
   (d.1) bypass means, coupled to the on-chip prioritizing means for selectively bypassing the function of the on-chip prioritizing means, thereby to permit an off-chip prioritizing operation.

5. An address generator for generating address sequences for application to a memory containing a plurality of circular buffers, each circular buffer being for storing sequential data received from a corresponding one of a plurality of data supply channels, the address generator comprising:
   (a) request receiving means for receiving at a given time, one or more service requests from a corresponding one or more of the plural data supply channels;
   (b) request identifying means for identifying the data supply channel associated with a received request and for generating a channel number signal representing the associated channel;
   (c) start-pointer storage means for storing a plurality of sequence start pointers each corresponding to one of said data supply channels, the start-pointer storage means being operatively coupled to receive the channel number signal and to responsively output a start pointer signal representing the sequence start pointer of a channel identified by the channel number signal; and
   (d) address sequence outputting means, coupled to receive the start pointer signal output from the start-pointer storage means and the corresponding channel number signal output from the request identifying means, the address sequence outputting means being for outputting a corresponding sequence of addresses each having a more significant portion corresponding to the circular buffer of a channel identified by the channel number signal and a less significant portion corresponding to a location within the circular buffer of the identified channel.

6. The address generator of claim 5 wherein a first of the sequence of address signals output by the address sequence outputting means references a sequence start location within the identified circular buffer corresponding to the sequence start pointer represented by the start pointer signal and where subsequent ones of the sequence of address signals output by the address sequence outputting means represent logically successive locations following the sequence start location and circling about the circular buffer for a prespecified distance.

7. The address generator of claim 6 further comprising:
(e) start pointer update means, coupled to the start-pointer storage means, for changing the value of a sequence start pointer stored in said start-pointer storage means, the changed start pointer being one which points to a circular buffer location that logically precedes within the corresponding circular buffer the sequence start location specified prior to the change.

8. The address generator of claim 5 further comprising:
(e) start pointer update means, coupled to the start-pointer storage means, for changing the value of a sequence start pointer stored in said start-pointer storage means.

9. The address generator of claim 5 further comprising:
(e) an integrated circuit chip on which the start-pointer storage means and the address sequence outputting means are defined.

10. The address generator of claim 5 further comprising:
(e) an integrated circuit chip on which the start-pointer storage means and request identifying means are defined.

11. An address generator for generating address sequences for application to a memory containing a plurality of circular buffers, the address generator comprising:
(a) buffer-identifying means for outputting a buffer-identifying signal identifying one of said circular buffers;
(b) pointer storage means, responsive to the buffer-identifying means, for storing a plurality of pointers, each corresponding to one of said circular buffers, and for outputting a pointer signal representing the pointer of a circular buffer identified by said buffer-identifying means;
(c) signal combining means, coupled to receive the buffer-identifying signal and the corresponding pointer signal, for generating a combined signal, where the combined signal includes at least a significant part of the pointer signal and optionally, part or all of the buffer-identifying signal; and
(d) signal sequencing means, for receiving said combined signal and generating therefrom a sequence of address signals, where each of the address signals of said sequence has a first part identifying one of the plural circular buffers and a second part pointing to a specific location within the identified circular buffer.

12. An address generator according to claim 11 further comprising:
(e) pointer update means, operatively coupled to the pointer storage means and to the buffer-identifying means, for changing a pointer stored in the pointer storage means, the changed pointer being that of a circular buffer identified by said buffer-identifying means.

13. An address generator according to claim 11 further comprising:
(e) length storage means, operatively coupled to the buffer-identifying means, for storing a plurality of length values, each corresponding to one of said circular buffers, and for outputting a length signal representing an active length of a circular buffer identified by said buffer-identifying means.

14. An address generator according to claim 11 further comprising:
(e) state sequencer means, operatively coupled to said signal sequencing means and to said buffer-identifying means, for indicating as a function of the buffer-identifying signal, the number of address signals to be included in the sequence of address signals generated by said signal sequencing means.

15. An address generator according to claim 11 further comprising:
(e) field size control means, operatively coupled to said signal combining means, for determining what part of the pointer signal constitutes the significant part that is included in the combined signal and what part, if any, of the buffer-identifying signal constitutes a part that is further included in the combined signal.

16. An address generator according to claim 15 wherein said field size control means is responsive to a first-supplied number-of-buffers enumerating signal and a second-supplied memory-size defining signal, said enumerating signal indicating the number of circular buffers in said memory and said memory-size defining signal indicating the storage capacity of said memory.

17. An address generator for generating address sequences for application to a first memory containing a plurality of circular buffers, each circular buffer being for storing sequential data samples received from a corresponding one of a plurality of data supply channels, the address generator comprising:
(a) channel identifying means for generating a channel signal identifying a specific one of the data supply channels;
(b) second memory means, responsive to the channel signal, for storing a plurality of sequence start specifiers each specifying a sequence start location within a corresponding one of the plurality of circular buffers and for outputting a sequence start specifier corresponding to the data supply channel identified by the channel signal;
(c) third memory means, responsive to the channel signal, for storing a plurality of sequence length specifiers each specifying a sequence length for a data sample sequence stored in a corresponding one of the of the plurality of circular buffers and for outputting a sequence length specifier corresponding to the data supply channel identified by the channel signal; and
(d) address sequence generating means, responsive to the output sequence start specifier and to the output sequence length specifier, for generating a sequence of address signals referencing locations in the first memory corresponding to portions of the circular buffer specified by the output sequence start specifier and the output sequence length specifier.

18. An address generator according to claim 17 further comprising:
    (e) update means, responsive to the channel signal and coupled to the second memory means, for updating the stored sequence start specifier of the identified data supply channel.

19. An address generator according to claim 17 wherein the address sequence generating means includes:
    (d.1) field size defining means for dividing each of the generated address signals into a plurality of at least first and second fields having respective first and second numbers of bits and for defining the number of bits in each of said first and second fields,
        wherein the first field represents a pointer into a location within the circular buffer of the identified data supply channel, and
        wherein the second field represents a pointer to the circular buffer of the identified data supply channel.

20. An address generator according to claim 19 wherein:
    the plurality of at least first and second fields includes a third field;
    the field size defining means defines the number of bits in the third field;
    the third field represents a null portion of each of the generated address signals.

21. A method for generating a sequence of address signals to be applied to a first memory containing a plurality of circular buffers, the method comprising the steps of:
    (a) storing a plurality of sequence start pointers in a second memory, each sequence start pointer specifying a sequence start location within a corresponding one of said plurality of circular buffers;
    (b) generating a channel number signal that identifies one of said plurality of circular buffers;
    (c) in response to the channel number signal, reading out from the second memory the start pointer of the identified circular buffer and transmitting the read-out start pointer to a sequencer;
    (d) generating an updated start pointer that is derived from the read-out start pointer and, after the read-out start pointer is transmitted to the sequencer, writing the updated start pointer into the second memory at the location previously occupied by the read-out start pointer;
    (e) combining the read-out start pointer with the generated channel number signal to thereby produce a first absolute address signal; and
    (f) outputting the first absolute address signal to the first memory.

22. A sequence generating method according to claim 21 comprising the step of:
    (g) after outputting the first absolute address signal, generating and outputting to the first memory, a plurality of additional absolute address signals that reference successive locations in the identified circular buffer of the first memory, where the successive locations logically follow within the identified circular buffer the location referenced by the first absolute address signal.

23. A sequence generating method according to claim 22 further comprising the steps of:
    (h) storing a plurality of sequence length specifiers in a third memory, each sequence length specifier specifying a sequence length for a sequence within a corresponding one of said plurality of circular buffers;
    (i) in response to the channel number signal, reading out from the third memory the sequence length specifier of the identified circular buffer and transmitting the read-out length specifier to said sequencer; and
    (j) using the read-out length specifier to define the number of successive locations in the identified circular buffer that are successively referenced by said absolute address signals.

24. A sequence generating method according to claim 22 wherein the step of generating the updated start pointer and writing the updated start pointer into the second memory occurs simultaneously with said steps of generating and outputting to the first memory, the first and additional absolute address signals.

25. A sequence generating method according to claim 21 wherein the step of combining includes:
    (e.1) first determining the number of circular buffers contained in the first memory;
    (e.2) second determining the storage capacity of the first memory; and
    (e.3) in response to said first and second determinations, defining a first field within the first absolute address signal corresponding to the read-out start pointer and a second field within the first absolute address signal corresponding to the generated channel number signal.

* * * * *